US012711447B2

(12) United States Patent
Namasivayam et al.

(10) Patent No.: US 12,711,447 B2
(45) Date of Patent: Aug. 18, 2026

(54) GENERATING AND VISUALIZING EFFECTIVITY SCORES

(71) Applicant: Dropbox, Inc., San Francisco, CA (US)

(72) Inventors: Vasanth Krishna Namasivayam, Danville, CA (US); Devin Mancuso, San Francisco, CA (US); Geoff Hulten, Lynnwood, WA (US); Shubham Goel, San Francisco, CA (US); Sateesh Srinivasan, Redwood City, CA (US); Jiayi Xu, Redmond, WA (US); Sean Stephens, Summer, WA (US)

(73) Assignee: Dropbox, Inc., San Francisco, CA (US)

( * ) Notice: Subject to any disclaimer, the term of this patent is extended or adjusted under 35 U.S.C. 154(b) by 129 days.

(21) Appl. No.: 18/533,751

(22) Filed: Dec. 8, 2023

(65) Prior Publication Data

US 2025/0190915 A1 Jun. 12, 2025

(51) Int. Cl.
*G06Q 10/06* (2023.01)
*G06Q 10/0639* (2023.01)
*G06Q 10/1093* (2023.01)

(52) U.S. Cl.
CPC ... *G06Q 10/06393* (2013.01); *G06Q 10/1093* (2013.01)

(58) Field of Classification Search
CPC ..................................................... G06Q 10/06
See application file for complete search history.

(56) References Cited

U.S. PATENT DOCUMENTS 8,180,663 B2 5/2012 Tischhauser et al.
8,560,371 B2 10/2013 Levitt
(Continued)

FOREIGN PATENT DOCUMENTS

JP 2021047524 A 3/2021

OTHER PUBLICATIONS

Phillips A., "Transforming how Microsoft Executives use their Time with Microsoft Outlook Calendar Analytics," Microsoft, Apr. 14, 2023, [Retrieved on Sep. 28, 2023], 12 pages, Retrieved from the Internet: URL: https://www.microsoft.com/insidetrack/blog/transforming-how-microsoft-executives-use-their-time-with-microsoft-outlook-calendar-analytics/.

Software, "Automatically Protect or Block Your Best Coding Times, Improve Work-life Balance, see How Meetings Impact Your Code Time, and More," Microsoft Outlook, Jun. 15, 2021, [Retrieved on Sep. 28, 2023], 5 pages, Retrieved from the Internet: URL: https://www.software.com/integrations/microsoft-outlook.

*Primary Examiner* — Nga B Nguyen
(74) *Attorney, Agent, or Firm* — Keller Preece PLLC

(57) ABSTRACT

The present disclosure is directed toward systems, methods, and non-transitory computer readable media for generating and visualizing effectivity scores from features extracted for different data of a time period. The disclosed systems generate a meeting effectivity score, a flow state effectivity score, and/or a work about work effectivity score that reflect measures of effectiveness or productivity. To generate the effectivity scores, the disclosed systems can leverage software connectors that extract features relevant to the respective effectivity scores for inputting into effectivity-score-generating models. Based on the effectivity scores, the disclosed systems can further generate recommendations for improving one or more of the effectivity scores. The disclosed systems can also generate and provide graphical visualizations of effectivity scores for display on a client device, together with recommendations for improving the effectivity scores.

20 Claims, 12 Drawing Sheets

(56) References Cited

U.S. PATENT DOCUMENTS

| | | | | |
|---|---|---|---|---|
| 10,176,233 | B1 | 1/2019 | Dean et al. | |
| 11,138,567 | B1* | 10/2021 | Schmoldt | G06Q 10/06393 |
| 11,516,036 | B1* | 11/2022 | Harathi | H04L 12/1827 |
| 11,595,528 | B2 | 2/2023 | Harris | |
| 11,741,434 | B2 | 8/2023 | Syfrig | |
| 12,443,926 | B1* | 10/2025 | D'Silva | G06Q 10/1093 |
| 2010/0023385 | A1 | 1/2010 | Galvan | |
| 2013/0132145 | A1* | 5/2013 | Hurewitz | G06Q 10/1093 705/7.19 |
| 2018/0046957 | A1* | 2/2018 | Yaari | G06Q 10/1095 |
| 2018/0300664 | A1 | 10/2018 | Ni et al. | |
| 2019/0370754 | A1* | 12/2019 | Berget | G06F 16/24578 |
| 2020/0097913 | A1 | 3/2020 | Beaujon et al. | |
| 2020/0234251 | A1* | 7/2020 | Ma | G07C 9/27 |
| 2020/0402019 | A1 | 12/2020 | Truong et al. | |
| 2021/0058263 | A1* | 2/2021 | Fahrendorff | H04L 67/306 |
| 2021/0133239 | A1 | 5/2021 | Brochu et al. | |
| 2021/0133692 | A1 | 5/2021 | Deluca et al. | |
| 2022/0013114 | A1 | 1/2022 | Camenares et al. | |
| 2022/0027859 | A1* | 1/2022 | Daga | G10L 15/26 |
| 2022/0138775 | A1* | 5/2022 | Mamdur | G06Q 30/0201 705/7.29 |
| 2023/0259863 | A1 | 8/2023 | Bukhari et al. | |

* cited by examiner

GENERATING AND VISUALIZING EFFECTIVITY SCORES

BACKGROUND

Advancements in computing devices and networking technology have given rise to a variety of innovations in cloud-based digital content storage and access. For example, online digital content systems can provide access to, and synchronize changes for, digital content items across devices all over the world. Existing systems can also provide a suite of computer applications to accomplish a variety of tasks in a workday, such as arranging a digital calendar, initiating and attending video calls, and sending and receiving digital communications (e.g., text messages, emails, and instant messages in a various formats). Indeed, modern online digital content systems can provide access to, and communicate about, digital content for user accounts across diverse physical locations and over a variety of computing devices. Despite these advances, however, existing digital content systems continue to suffer from a number of disadvantages, particularly in terms of navigational efficiency and computational efficiency.

As just suggested, some existing digital content systems are navigationally inefficient. In particular, many existing systems require excessive numbers of client device interactions to arrange and modify events within a digital calendar. For example, existing systems generally require separate client device interactions for creating or modifying each individual event within a digital calendar (whether the event is recurring or standalone). Such client device interactions compound as the number of events increases for user accounts. Accordingly, existing systems provide inefficient user interfaces that require excessive numbers of interactions that could otherwise be reduced with more efficient computer-generated tools and interfaces.

As a contributing factor to their navigational inefficiencies, some existing systems require excessive numbers of client device interactions to navigate across various interfaces and/or applications. More specifically, as a result of their unorganized nature, existing systems often require user accounts to frequently switch from one application or interface to another to perform respective processes as part of a workday (e.g., by using one application to send an email and another application to generate a demo video for a product release unrelated to the email). Indeed, many existing systems are prone to a high degree of context switching due to their lack of insight into digital calendars and user account behavior amongst computer applications. Constantly navigating between computer applications throughout a workday requires excessive numbers of client device interactions that could otherwise be reduced with more efficient systems.

Due at least in part to their navigational inefficiencies, many existing digital content systems are computationally inefficient as well. To elaborate, existing systems often expend excessive amounts of computational resources, such as processing power and memory, processing the excessive numbers of client device interactions that result from the inefficient interfaces and fragmented nature of existing systems. In addition, existing systems waste computational resources opening and running many different computer applications (e.g., simultaneously with one another or opening and closing one after the other, then reopening previous applications) as client devices constantly switch contexts from one process to another throughout a workday. Accordingly, existing systems inefficiently expend computational resources that could otherwise be preserved with a more efficient system.

Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems generate and visualize effectivity scores from features extracted for different data associated with a time period. In some embodiments, the disclosed systems generate a meeting effectivity score, a flow state effectivity score, and/or a work about work effectivity score that reflect measures of effectiveness or productivity for different aspects of a time period. To generate the effectivity scores, the disclosed systems can leverage software connectors that extract features relevant to the respective effectivity scores (e.g., from computer applications, digital calendars, and/or monitored user account behavior) for inputting into effectivity-score-generating models. Based on the effectivity scores, the disclosed systems can further generate recommendations for improving one or more of the effectivity scores by, for example, modifying a digital calendar by rearranging events (e.g., with a single click) to reduce context switching and increase a flow state. The disclosed systems can also generate and provide graphical visualizations of effectivity scores for display on a client device, together with recommendations for improving the effectivity scores.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

Figure 1:
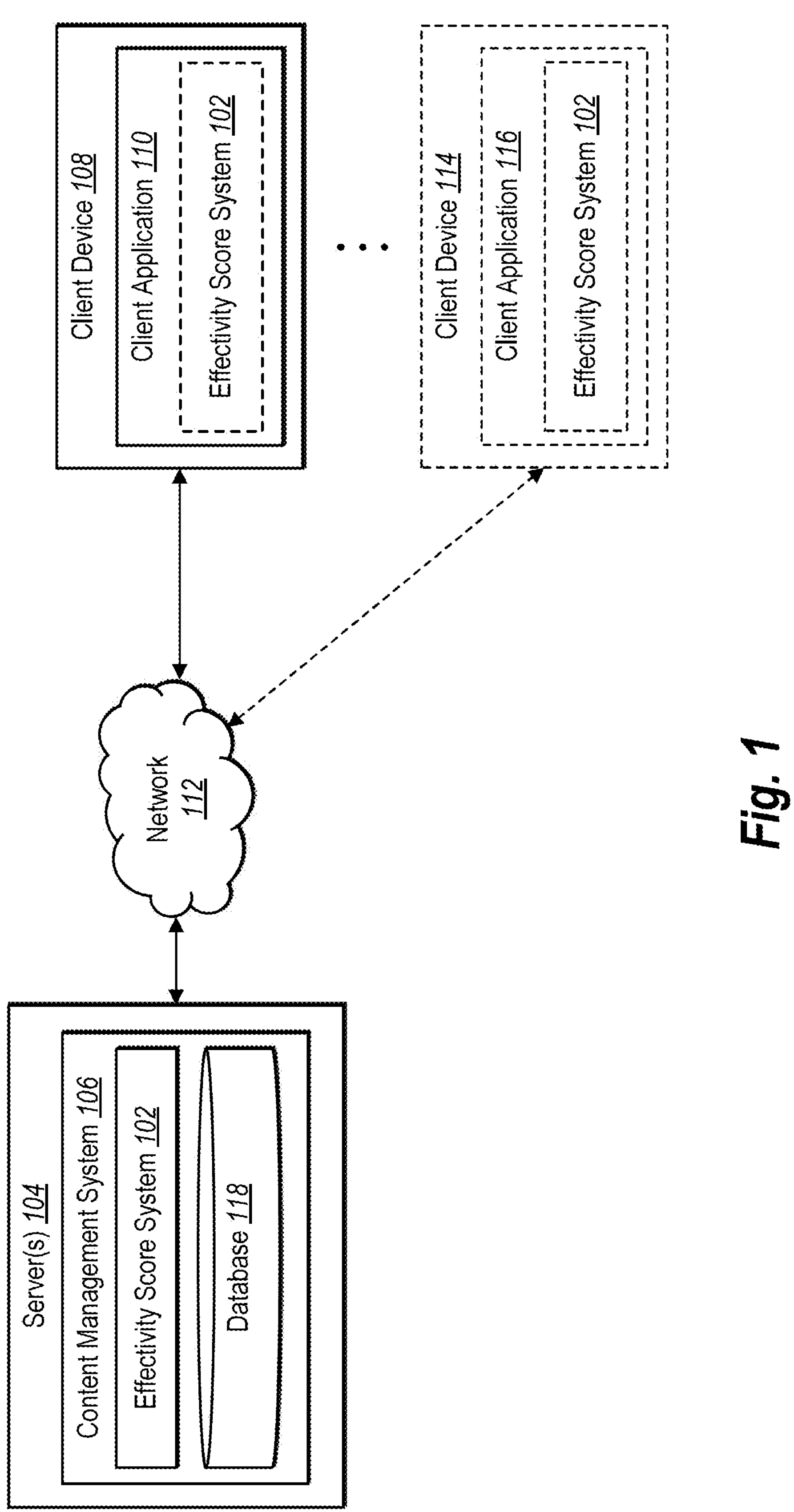
FIG. 1 illustrates a schematic diagram of an example environment of an effectivity score system in accordance with one or more embodiments.

This disclosure describes one or more embodiments of an effectivity score system that can generate, and provide recommendations for improving, effectivity scores using models to process features extracted from computer applications, digital calendars, and/or user account behavior. For example, the effectivity score system can generate effectivity scores to reflect a measure of health or effectiveness for different aspects of a workday, including meetings, flow state, and work about work. In many situations, scoring the health or effectiveness of a workday in three parts: i) meeting effectivity, ii) flow state effectivity, and iii) work about work effectivity, reflects the health of a workday because, in many organizations, workdays are largely made up of time spent during meetings (e.g., virtual and/or non-virtual meetings), time spent in a flow state (e.g., uninterrupted focus time for accomplishing tasks), and time spent doing work about work (e.g., menial tasks, administrative tasks, or other tasks that are not part of a job description for a given organizational role). Accordingly, the effectivity score system can generate effectivity scores using software connectors to extract features for processing using models that generate each respective effectivity score. The effectivity score system can further generate visualizations of the effectivity scores to provide for display on a client device, along with recommendations or suggestions to improve one or more of the effectivity scores.

As just mentioned, the effectivity score system can generate different types of effectivity scores for different aspects of time expenditure during a workday. For example, the effectivity score system can generate a meeting effectivity score to indicate an effectiveness of one or more meetings for a user account (e.g., within a workday or across multiple workdays). In addition, the effectivity score system can generate a flow state effectivity score to indicate an effectiveness of flow state time for a user account (e.g., within a workday or across multiple workdays). Further, the effectivity score system can generate a work about work effectivity score to indicate an effectiveness for work about work of a user account (e.g., within a workday or across multiple workdays). In some cases, the effectivity score system further generates a hybrid effectivity score by combining two or more of the different effectivity scores for a user account.

To generate an effectivity score, the effectivity score system can utilize a software connector that extracts features relevant to the particular score. In addition, the effectivity score system utilizes various models, such as trained machine learning models, to generate effectivity scores by processing respective types of extracted features. For instance, the effectivity score system utilizes a meeting effectivity model to generate a meeting effectivity score from meeting features and likewise utilizes a flow state effectivity model and a work about work effectivity model to generate effectivity scores from their own respective features.

As noted, the effectivity score system can generate a graphical visualization of one or more effectivity scores. For example, the effectivity score system can generate a graphical visualization in the form of a set of concentric shapes (e.g., circles or rings), where each shape represents its own effectivity score. In some cases, each ring has its own color or pattern to represent the different scores, and the completeness of the circumference of a ring (e.g., in a clockwise or counterclockwise direction) reflects an effectivity score. For instance, a ring that starts and twelve o'clock and continues for 300 degrees may reflect a higher effectivity score than a ring that starts at twelve o'clock and continues for only 200 degrees.

In some embodiments, the effectivity score system further generates and provides recommendations or suggestions for improving one or more effectivity scores. For example, the effectivity score system can generate a recommendation for moving a single calendar event, having a bot attend a virtual meeting in a user's place, condensing calendar events for an entire workday (or multiple workdays), load balancing calendar events across workdays, and/or reducing work about time.

As suggested above, through one or more of the embodiments mentioned above (and described in further detail below), the effectivity score system can provide several improvements or advantages over existing digital content systems. For example, the effectivity score system can improve navigational efficiency over prior systems. Indeed, while some prior systems require excessive numbers of user interactions to granularly generate and modify events for digital calendars, the effectivity score system provides an effectivity interface that, in some cases, includes a single-click option to condense a digital calendar for a user account. Thus, in response to a selection of the calendar condensing option, the effectivity score system can rearrange calendar events for a user account to achieve a target (or threshold) effectivity score, such as a flow state effectivity score. In some cases, rearranging the calendar events includes automatically (e.g., without additional client device interaction directed to) determining new times for scheduling one or more calendar events, automatically generating and distributing digital communications to other attendees of scheduled meetings or other events (e.g., to notify of changes), and/or automatically generating or modifying events in a digital calendar, all in response to a single client device interaction. Accordingly, the effectivity score system greatly improves the navigational efficiency of managing digital calendars by reducing the number of client device interactions compared to prior systems.

As another example of improved navigational efficiency, the effectivity score system further reduces or prevents frequent navigation or switching between computer applications or interfaces throughout a workday. To elaborate, while some existing systems provide no insight into the impact of context switching between various tasks of a workday (and therefore offer no guidance to prevent constant navigation across many different applications), the effectivity score system increases flow states for user accounts to reduce context switching and decrease navigation across various applications and interfaces. Indeed, by rearranging calendar events to improve flow state effectivity scores, by identifying which meetings to attend and which to assigns bots, and by condensing work about actions into continuous time periods (rather than sporadically spread throughout a workday), the effectivity score system greatly reduces context switching and the corresponding navigational inputs between computer applications and interfaces.

Due at least in part to its improved navigational efficiency, the effectivity score system can also improve computational efficiency over existing digital content systems. For example, as opposed to prior systems that expend computational resources processing the excessive user interactions for managing digital calendars and switching between computer applications, the effectivity score system can reduce computational expense in these contexts by processing fewer client device interactions. In addition, the effectivity score system can save additional computational resources by reducing the burden of prior systems that repeatedly open and run the same computer applications many times throughout a workday as users switch back and forth between tasks. Indeed, by improving effectivity scores through rearranging calendar events, reducing wasteful meeting time, and reducing work about time, the effectivity score system increases flow states where client devices run applications relevant to a current task without switching across applications as much. Such reduced application switching saves computer resources by freeing memory that would otherwise be dedicated to preserve or store states of different applications (or tabs within applications) that are simultaneously running for different tasks.

As a further advantage, the effectivity score system provides a technical solution to a technical problem that specifically arises in the realm of computer technology. Specifically, if not for the advent of digital calendars which are accessible and modifiable by many user accounts across computer networks, client devices would not process the same number of operations for switching between so many computer applications that arises from the constant context switching demanded by calendar events. For example, digital calendars introduced the possibility of some user accounts (e.g., team leads or administrators) unilaterally creating calendar events that appear on the digital calendars of other user accounts which are then are obligated to accommodate (e.g., by attending meetings or accomplishing tasks). The effectivity score system solves this problem by providing visible, tangible metrics for indicating workday health in the form of effectivity scores, along with recommendations for improving effectivity scores through automated, intelligent (e.g., machine-learning-based) digital calendar management.

As illustrated by the foregoing discussion, the present disclosure utilizes a variety of terms to describe features and benefits of the effectivity score system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

As mentioned, the effectivity score system can generate effectivity scores for a user account. As used herein, the term "meeting effectivity score" refers to a model-generated score that indicates an effectiveness or a productivity of a meeting, such as a virtual meeting (e.g., a video call) for a user account. For example, a meeting effectiveness score can represent a predicted effectiveness for an upcoming meeting or can represent an observed effectiveness for a completed meeting. In some cases, a meeting effectiveness score is a score for a time period (e.g., a workday or some other time period) that reflects an effectiveness of meetings during the time period. A meeting effectiveness score stems from, or is based on, meeting features (e.g., observable features or unobservable latent features) extracted from meeting data, such as a meeting agenda, a rating for how well-crafted a meeting invite is, number invitees (and which user accounts are invited), number of attendees (and which user accounts attend), duration, scheduled date and time, recurrence, and/or whether the meeting is a follow-up to another meeting.

In addition, the term "flow state effectivity score" refers to a model-generated score that indicates an effectiveness or a productivity of a flow state. For example, a flow state effectivity score indicates how effective a particular time period (e.g., a workday) is with respect to a flow state (e.g., how much of the time period is made up of flow state time). In some cases, a flow state effectivity score is a prediction for a future flow state (or a future time period), while in other cases a flow state effectivity score is an evaluation for a flow state (or time period) that has already occurred. A flow state effectivity score stems from, or is based on, flow state features (e.g., observable features or unobservable latent features) extracted from flow state data, such as a sparsity or density of calendar events within a digital calendar (e.g., for a particular time period), including durations of the calendar events. Relatedly, the term "flow state" refers to an uninterrupted time period (of at least a threshold duration) during a workday without intervening calendar events or other interruptions where tasks are performed most effectively. In some cases, different user account roles within an organization have different thresholds for flow state effectivity, where some roles require longer periods of flow state than others to achieve a healthy flow state effectivity score. Thus, the effectivity score system can generate flow state effectivity scores differently for different roles.

Further, the term "work about work effectivity score" refers to a model-generated score that indicates an effectiveness or a productivity of work about work. For example, a work about work effectivity score reflects an effectiveness of time expenditure during a workday considering durations of time spend on work about actions. In some cases, a work about work effectivity score stems from, or is based on, work about features (e.g., observable features or unobservable latent features) extracted from work about actions. Relatedly, the term "work about action" refers to a user account activity, computer process, or operation, or task that is not part of a job description (e.g., menial or administrative tasks) for a role assigned to a user account within an organization and/or within a content management system. In some cases, what constitutes a work about action differs depending on a user account role within an organization, where certain processes for one role may be part of a job description while not part of the description for another role. Thus, the effectivity score system can generate a work about work effectivity score differently depending on the user account role.

As indicated above, the effectivity score system can generate effectivity scores using models, such as a meeting effectivity model, a flow state effectivity model, and/or a work about work effectivity model. As used herein, the term "meeting effectivity model" refers to a model, such as a machine learning model, that generates a meeting effectivity score by processing meeting features extracted by a meeting connector. In addition, the term "flow state effectivity model" refers to a model, such as a machine learning model, that generates a flow state effectivity score by processing flow state features extracted by a flow state connector. Further, the term "work about work effectivity model" refers to a model, such as a machine learning model, that generates a work about work effectivity score by processing work about features extracted by a work about connector.

Relatedly, as used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. In some embodiments, the effectivity score system utilizes a large language machine learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., effectivity scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, a transformer neural network, a diffusion neural network, or a generative adversarial neural network.

As noted, the effectivity score system can generate effectivity scores by extracting various types of features using connectors. As used herein, the term "connector" refers to a computer code segment or program that retrieves or extracts features that define information from user-account-facing applications, such as digital calendars, video call applications, email applications, text messaging applications, and other applications. Thus, a "meeting connector" refers to a computer program that retrieves or extracts meeting features, while a "flow state connector" refers to a computer program that retrieves or extracts flow state features, and a "work about connector" refers to a computer program that retrieves or extracts work about features.

In some cases, the effectivity score system utilizes a score improvement model to generate a recommendation for improving one or more effectivity scores. As used herein, the term "score improvement model" refers to a machine learning model (e.g., a neural network) that generates a recommendation for improving an effectivity score. Such recommendations include modifying a digital calendar and/or assigning a bot to attend a virtual meeting for a user account. A score improvement model can be trained to generate predicted effectivity scores and/or predicted time ratios (e.g., ratios of meeting time, flow state time, and/or work about time).

Additional detail regarding the effectivity score system will now be provided with reference to the figures. For example, FIG. 1 illustrates a schematic diagram of an example system environment for implementing an effectivity score system 102 in accordance with one or more implementations. An overview of the effectivity score system 102 is described in relation to FIG. 1. Thereafter, a more detailed description of the components and processes of the effectivity score system 102 is provided in relation to the subsequent figures.

As shown, the environment includes server(s) 104, client device 108, and a network 112. In some embodiments, the environment also includes additional client devices, such as the client device 114. Each of the components of the environment can communicate via the network 112, and the network 112 may be any suitable network over which computing devices can communicate. Example networks are discussed in more detail below in relation to FIGS. 11-12.

As mentioned above, the example environment includes a client device 108 (and, in some embodiments, the client device 114). The client device 108 and/or the client device 114 can be one of a variety of computing devices, including a smartphone, a tablet, a smart television, a desktop computer, a laptop computer, a virtual reality device, an augmented reality device, or another computing device as described in relation to FIGS. 11-12. The client device 108 and/or the client device 114 can communicate with the server(s) 104 via the network 112. For example, the client device 108 can receive user input from a user interacting with the client device 108 (e.g., via the client application 110) to, for instance, access, generate, modify, or share a content item, to collaborate with a co-user of a different client device, or to select a user interface element. Similarly, the client device 114 can receive user input via the client application 116. In addition, the effectivity score system 102 on the server(s) 104 can receive information relating to various interactions with content items and/or user interface elements based on the input received by the client device 108 and/or the client device 114 (e.g., to arrange a meeting, generate an email, or modify a digital calendar).

As shown, the client device 108 can include a client application 110 (and the client device 114 can include a client application 116). In particular, the client application 110 and/or the client application 116 may be a web application, a native application installed on the client device 108 and/or the client device 114 (e.g., a mobile application, a desktop application, etc.), or a cloud-based application where all or part of the functionality is performed by the server(s) 104. Based on instructions from the client application 110, the client device 108 can present or display information, including an effectivity interface for presenting graphical visualizations of effectivity scores.

As illustrated in FIG. 1, the example environment also includes the server(s) 104. The server(s) 104 may generate, track, store, process, receive, and transmit electronic data, such as digital content items, features, effectivity scores, interface elements, interactions with digital content items, interactions with interface elements, and/or interactions between user accounts or client devices. For example, the server(s) 104 may receive data from the client device 108 (or from other client devices) in the form of features extracted by one or more connectors, such as digital communications, user account interactions within various application, and/or digital calendar events. In addition, the server(s) 104 can transmit data to the client device 108 in the form of an effectivity interface that includes a graphical visualization of effectivity scores generated from the features. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the effectivity score system 102 as part of a content management system 106. The content management system 106 can communicate with the client device 108 to perform various functions associated with the client application 110 such as managing user accounts, managing content collections, managing content items, and facilitating user interaction with the content collections and/or content items. Indeed, the content management system 106 can include a network-based smart cloud storage system to manage, store, and maintain content items and related data across numerous user accounts, including user accounts in collaboration with one another. In some embodiments, the effectivity score system 102 and/or the content management system 106 utilize a database 118 to store and access information such as digital content items, effectivity scores, and user account behavior data.

Although FIG. 1 depicts the effectivity score system 102 located on the server(s) 104, in some implementations, the effectivity score system 102 may be implemented by (e.g., located entirely or in part on) one or more other components of the environment. For example, the effectivity score system 102 may be implemented by the client device 108, by the client device 114, and/or a third-party device. For example, the client device 108 can download all or part of the effectivity score system 102 for implementation independent of, or together with, the server(s) 104.

In some implementations, though not illustrated in FIG. 1, the environment may have a different arrangement of components and/or may have a different number or set of components altogether. For example, the client device 108 and/or the client device 114 may communicate directly with the effectivity score system 102, bypassing the network 112. As another example, the environment can include the database 118 located external to the server(s) 104 (e.g., in communication via the network 112) or located on the server(s) 104, on a third-party system, and/or on the client device 108.

Figure 2:
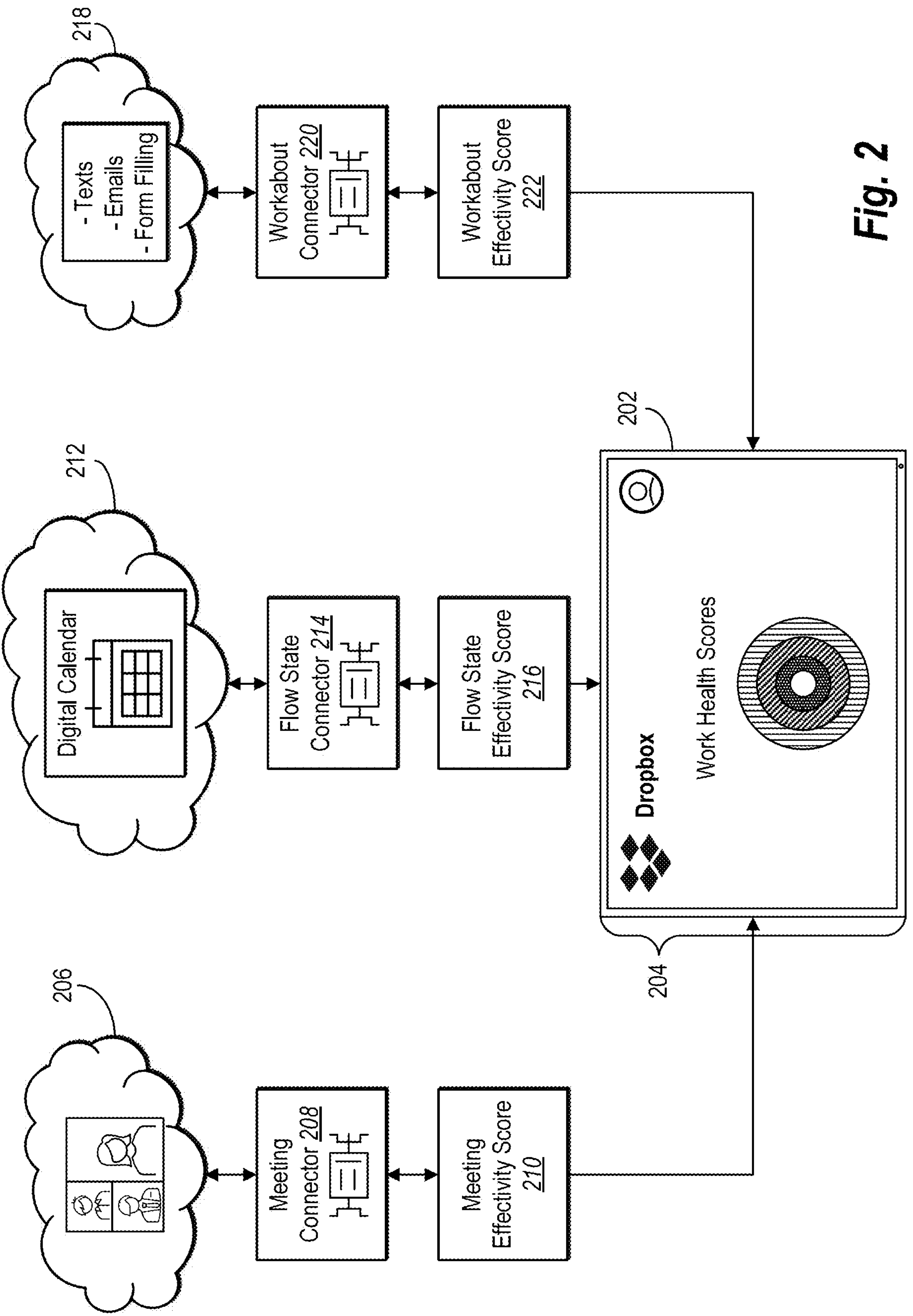
FIG. 2 illustrates an example overview of generating and visualizing effectivity scores in accordance with one or more embodiments.

As mentioned above, the effectivity score system 102 can generate and provide graphical visualizations for effectivity scores of a user account. In particular, the effectivity score system 102 can generate effectivity scores from features extracted from computer applications engaged by a user account and can generate graphical representations of the effectivity scores for display on a client device. FIG. 2 illustrates an example overview of generating effectivity scores and graphical visualizations for effectivity scores in accordance with one or more embodiments. Additional detail regarding the various acts and processes introduced in FIG. 2 is provided below with reference to subsequent figures.

As illustrated in FIG. 2 the effectivity score system 102 generates an effectivity interface 204 for display on a client device 202. In particular, the effectivity score system 102 generates the effectivity interface 204 to include or portray effectivity scores for a user account. Indeed, the effectivity score system 102 generates a graphical visualization of effectivity scores in the form of a set of concentric shapes (e.g., rings), where each of the shapes represents its own effectivity score (e.g., in its own color or pattern). In some cases, the completeness of the ring around a full 360-degree circumference corresponds to an effectivity score, where more complete rings depict higher effectivity scores. Thus, the effectivity score system 102 generates the effectivity interface 204 to depicts an overall workday health relating to time expenditure for productivity or effectiveness.

To generate the effectivity interface 204, the effectivity score system 102 generates a set of effectivity scores. In particular, the effectivity score system 102 generates effectivity scores by using connectors to extract score-specific features from user-facing computer applications, such as user account behavior, digital communications, calendar events, and more. In some embodiments, the connectors are as described by V. Namasivayam et al. in U.S. patent application Ser. No. 18/478,061, titled GENERATING AND MAINTAINING COMPOSITE ACTIONS UTILIZING LARGE LANGUAGE MODELS, filed Sep. 29, 2023, and in U.S. patent application Ser. No. 18/478,066, titled GENERATING AND MAINTAINING COMPOSITE ACTIONS UTILIZING LARGE LANGUAGE MODELS, filed Sep. 29, 2023, both of which are incorporated herein by reference in their entireties.

For instance, the effectivity score system 102 generates a meeting effectivity score 210 for meeting data associated with a user account with the content management system 106. To elaborate, the effectivity score system 102 utilizes a meeting connector 208 (or multiple meeting connectors) to extract features from one or more computer applications (run via the client device 202) relating to meetings of the user account. In some cases, the meeting connector 208 extracts meeting features for scheduled meetings, for upcoming meetings, for currently ongoing meetings, and/or for past meetings that have already occurred. In these or other cases, the meeting connector 208 extracts meeting features specifically for virtual meetings (e.g., video calls) where attendance is monitored via computer applications (e.g., video call applications) connected over a computer network. As shown, the meeting connector 208 extracts meeting features from a virtual meeting 206, where the meeting features include a binary indication of whether a meeting agenda is created for the virtual meeting 206, a number invitees, indications of which user accounts are invited, a number of attendees, indications of which user accounts are (or were) in attendance, a scheduled duration of the virtual meeting 206, an actual duration of the virtual meeting 206, a scheduled date and time, a binary indication of whether the virtual meeting 206 is a recurring meeting, one or more topics discussed during the virtual meeting 206, and/or a binary indication of whether the virtual meeting 206 is a follow-up to another meeting. In some embodiments, the meeting connector 208 extracts meeting features, such as latent features, that the effectivity score system 102 uses to determine representing relationships with other past meetings or future scheduled meetings (e.g., by comparing meeting vectors generated from latent features in an embedding space).

As also illustrated in FIG. 2, the effectivity score system 102 generates the meeting effectivity score 210 from features extracted by the meeting connector 208. For example, the effectivity score system 102 utilizes a meeting effectivity model to process the meeting features to generate the meeting effectivity score 210. In some cases, the meeting effectivity score 210 represents a measure of effectiveness or productivity for the virtual meeting 206 (e.g., based on the meeting features, such as how related the topics of the virtual meeting 206 are to the user account within a knowledge graph, a duration of the virtual meeting 206, and other features).

As further illustrated in FIG. 2, the effectivity score system 102 generates a flow state effectivity score 216. To generate the flow state effectivity score 216, the effectivity score system 102 utilizes a flow state connector 214 to extract flow state features for the user account. For instance, the flow state connector 214 extracts flow state features from a digital calendar 212 (stored within the content management system 106 or elsewhere) associated with the user account. In some cases, the flow state connector 214 extracts flow state features, including a sparsity or a density of calendar events within the digital calendar 212. Specifically, the flow state connector 214 extracts data indicating scheduling and durations for events which the effectivity score system 102 uses to determine a sparsity.

Using the extracted flow state features (e.g., the calendar sparsity), the effectivity score system 102 utilizes a flow state model to generate the flow state effectivity score 216. More particularly, the effectivity score system 102 generates the flow state effectivity score 216 to indicate an effectiveness or a productivity for a time period, as reflected by events scheduled in the digital calendar 212. In certain embodiments, a higher sparsity corresponds to a lower flow state effectivity score 216 because sparsely spread events prevent (or break up) uninterrupted time periods for entering a flow state for focusing on important (non-work about) tasks.

As further illustrated in FIG. 2, the effectivity score system 102 generates a work about work effectivity score 222. In particular, the effectivity score system 102 generates the work about work effectivity score 222 from work about features extracted by a work about connector 220. Indeed, the work about connector 220 extracts work about features from user account behavior 218 associated with a user account. Such work about features include a time spent on (and/or a total number of) work about actions performed over a time period (e.g., a workday). The effectivity score system 102 thus utilizes a work about work effectivity model to generate the work about work effectivity score 222 from the extracted features (e.g., where less time spent on work about actions corresponds to a higher work about work effectivity score 222).

Figure 3:
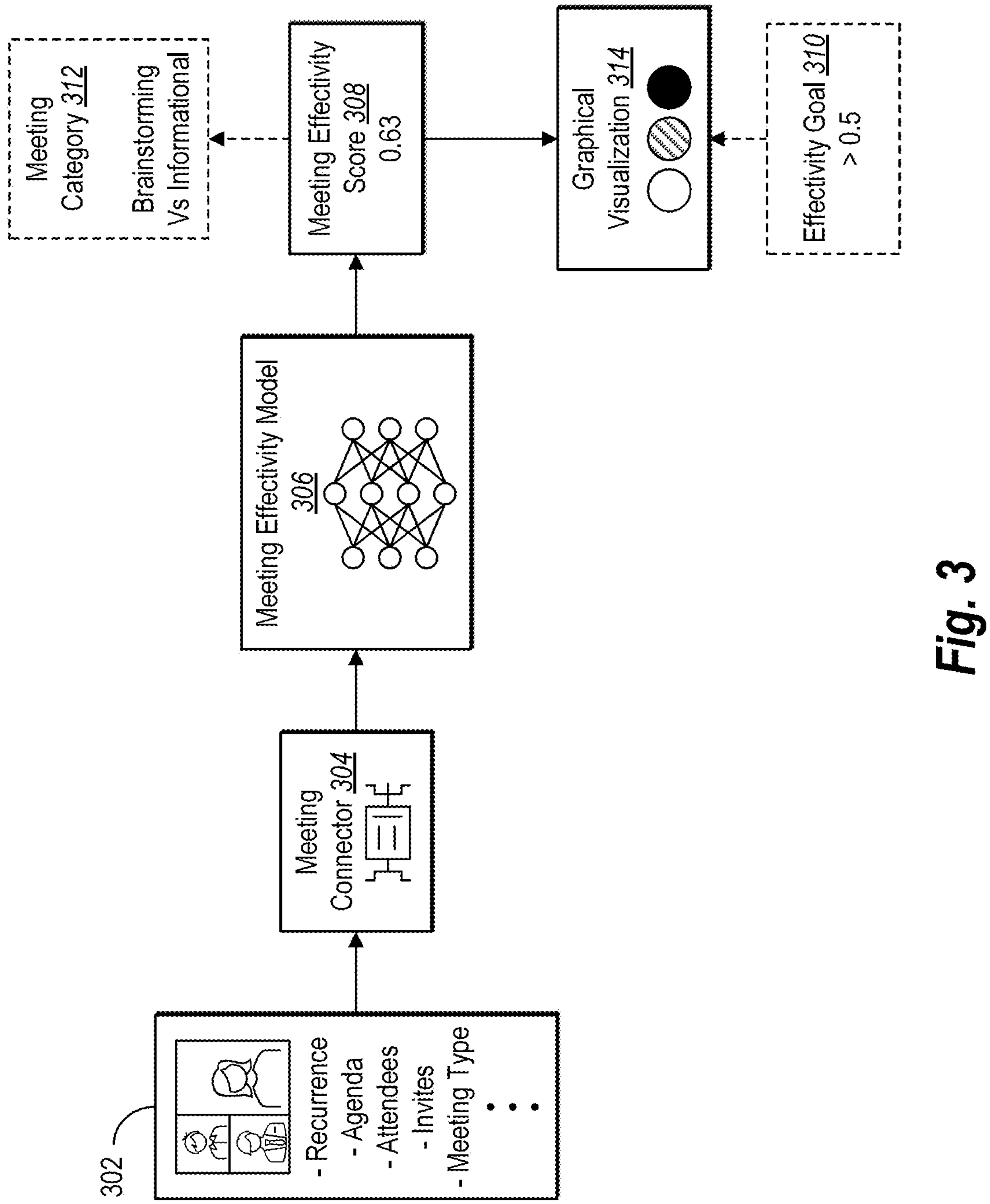
FIG. 3 illustrates an example diagram for generating meeting effectivity scores in accordance with one or more embodiments.

As noted above, in certain described embodiments, the effectivity score system 102 generates a meeting effectivity score for a user account. In particular, the effectivity score system 102 utilizes a meeting effectivity model, such as a specifically trained machine learning model, to generate a meeting effectivity score from extracted meeting features. FIG. 3 illustrates an example diagram for generating a meeting effectivity score in accordance with one or more embodiments.

As illustrated in FIG. 3, the effectivity score system 102 utilizes a meeting connector 304 to extract meeting features 302 for one or more meetings (e.g., virtual and non-virtual meetings) associated with a user account. For example, the meeting connector 304 extracts meeting features for a single meeting or for multiple meetings within a particular time period (e.g., a workday). In some embodiments, the meeting connector 304 extracts features from a virtual meeting, such as a video call, by monitoring video call data from a video call application. For instance, the meeting connector 304 extracts features such as discussed topics, user accounts in attendance, and/or presence of an agenda attached to the video call.

As further illustrated in FIG. 3, the effectivity score system 102 utilizes a meeting effectivity model 306, such as a neural network, to generate a meeting effectivity score 308. More specifically, the meeting effectivity model 306 generates the meeting effectivity score 308 by processing the meeting features 302. In some embodiments, the meeting effectivity model 306 is trained to generate meeting effectivity scores based on sample meeting features and corresponding ground truth meeting effectivity scores. For instance, a set of sample meeting features is assigned a ground truth meeting effectivity score, and the effectivity score system 102 adjusts parameters of the meeting effectivity model 306 to improve its accuracy in predicting the ground truth score (and does so over multiple iterations for different ground truth scores and different sample features).

In some cases, the meeting effectivity model 306 generates or extracts a latent vector from the meeting features 302 to represent a meeting in a latent embedding space. In these or other cases, the meeting effectivity model 306 generates or extracts a latent vector (or multiple latent vectors) to represent meetings for a user account within a time period (e.g., a workday). The meeting effectivity model 306 can further compare a latent meeting vector with a user account vector extracted from features associated with the user account. The meeting effectivity model 306 can thus generate the meeting effectivity score 308 based on comparing meeting vectors with user account vectors in the embedding space (e.g., to determine a distance, such as a cosine distance).

In some embodiments, the meeting effectivity model 306 generates a higher meeting effectivity score 308 for a meeting (or a time period) that is more important and/or was a more effective use of time (e.g., a brainstorming meeting or a one-on-one meeting specific to a project). In one or more embodiments, the meeting effectivity model 306 generates a lower meeting effectivity score 308 for a meeting (or a time period) that is less important and/or was a less effective user of time (e.g., an all-hands meeting for announcements or general information).

As mentioned, in some cases, the meeting effectivity model 306 generates the meeting effectivity score 308 as a predicted score for an upcoming meeting or an upcoming time period. For example, the meeting effectivity model 306 processes features that correspond to one or more scheduled meetings, such as the presence of an agenda, a rating for how well-crafted the meeting invite is (e.g., a number of characters or mentions of particular user accounts or topics), and/or user accounts invited to attend the meeting. If the meeting has no agenda, a generic invite, and/or a large number of invitees, the meeting effectivity score 308 is lower. On the other hand, if the meeting has an agenda, a customized crafted invite, and/or a small number of invitees (which means a higher likelihood of user account participation and involvement on topics relevant to the user account), then the meeting effectivity score 308 is higher.

As shown in FIG. 3, in certain cases, the effectivity score system 102 further generates a graphical visualization 314 of the meeting effectivity score 308. In particular, the effectivity score system 102 generates a graphical representation to visualize what the meeting effectivity score 308 represents for a user account. For instance, the meeting effectivity score 308 can correspond to an amount of preparation time for a user account, where a higher score corresponds to a higher preparation time because the meeting is more relevant to the user account. The effectivity score system 102 can thus generate the graphical visualization 314 in the form of a colored stoplight, where a first color (e.g., green) indicates a low effectivity score below a bottom threshold for a meeting that is less important, a second color (e.g., yellow) indicates a moderate effectivity score between the bottom threshold and a top threshold for a meeting that is moderately important, and a third color (e.g., red) indicates a high effectivity score above the top threshold for a meeting that is highly important.

In one or more embodiments, the meeting effectivity model 306 generates the meeting effectivity score 308 as an evaluation of a meeting or a time period that has already occurred. For example, the meeting effectivity model 306 processes features for one or more meetings that occurred during a time period, such as a number of user accounts who attended the meeting, which user accounts attended the meeting, a duration of the meeting, a binary indication of presence of an agenda, and one or more topics discussed during the meeting. The meeting effectivity model 306 thus generates the meeting effectivity score 308 to indicate how effectively a user account expended time in attending the meeting. In some cases, the meeting effectivity score 308 is on a normalized scale from 0 to 1, while in other cases the meeting effectivity score 308 is on a different scale (e.g., 0 to 10, 0 to 100, etc.).

As illustrated in FIG. 3, the effectivity score system 102 can receive or determine an effectivity goal 310. For example, the effectivity score system 102 can receive an indication from a client device of the effectivity goal 310 set by a user account. In some cases, the effectivity score system 102 sets an effectivity score threshold based on the effectivity goal 310. Specifically, the effectivity score system 102 sets the effectivity score threshold to impact the graphical visualization 314. For instance, the effectivity score system 102 determines one or more effectivity score thresholds that divide or delineate different colors or patterns for the graphical visualization 314. In some cases, the effectivity score system 102 generates the graphical visualization 314 in a first color (or a first pattern) based on the meeting effectivity score 308 satisfying the effectivity goal 310 (which defines a threshold). In these or other cases, the effectivity score system 102 generates the graphical visualization 314 in a second color (or a second pattern) based on the meeting effectivity score 308 exceeding the effectivity goal 310 by at least a threshold amount (or based on exceeding a second threshold set above the first threshold).

As also illustrated in FIG. 3, the effectivity score system 102 can determine a meeting category 312. For example, the effectivity score system 102 can determine the meeting category 312 based on the meeting effectivity score 308. In some embodiments, the effectivity score system 102 determines the meeting category to indicate a level of importance (or a preparation time) of a meeting. As shown, the effectivity score system 102 utilizes a threshold to categorize meetings as either brainstorming meetings that require involvement from a user account (and thus require preparation time) or informational meetings that do not require involvement from the user account. In certain cases, the meeting category 312 corresponds to a color or pattern shown in the graphical visualization 314.

Figure 4:
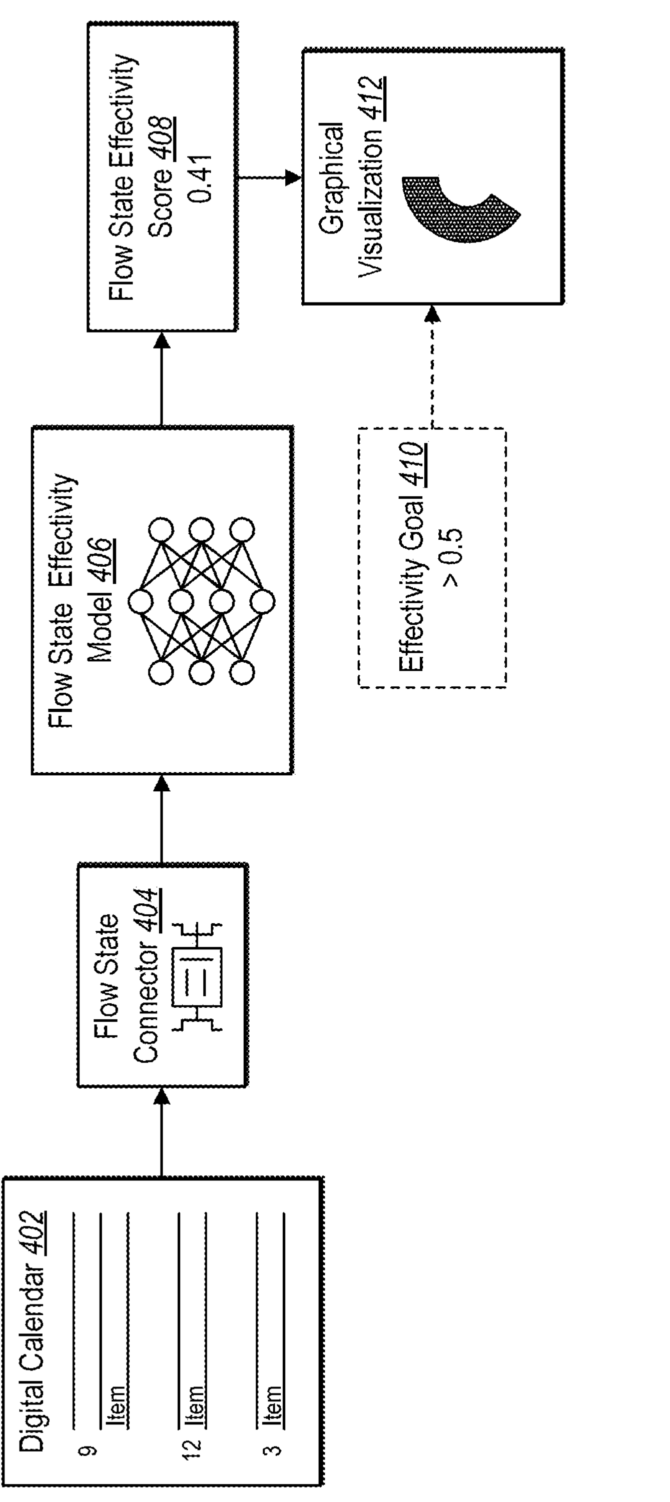
FIG. 4 illustrates an example diagram for generating flow state effectivity scores in accordance with one or more embodiments.

As mentioned above, in certain described embodiments, the effectivity score system 102 generates a flow state effectivity score for a user account. In particular, the effectivity score system 102 utilizes a flow state effectivity model, such as a specifically trained machine learning model, to generate a flow state effectivity score from extracted flow state features. FIG. 4 illustrates an example diagram for generating a flow state effectivity score in accordance with one or more embodiments.

As illustrated in FIG. 4, the effectivity score system 102 utilizes a flow state connector 404 to extract features from a digital calendar 402 associated with a user account. For example, the flow state connector 404 extracts calendar features for a single time period (e.g., a workday or multiple appended workdays) or for multiple time periods. In some embodiments, flow state connector 404 extracts features from a digital calendar by identifying previous and upcoming calendar events. For instance, the flow state connector 404 extracts features that indicate timing of calendar events within the time period. The effectivity score system 102 can further determine a sparsity based on the features.

The effectivity score system 102 can determine a sparsity by determining scheduled dates and times for calendar events and their timing-based relatedness to one other over a time period. More specifically, the effectivity score system 102 can determine a sparsity by comparing a number of available time slots (or a total amount of available time) within a time period to a number of scheduled time slots (or a total amount of scheduled time). In some cases, the effectivity score system 102 determines a sparsity by further determining a spread of scheduled events to indicate how closely scheduled events are to one another and/or how many events are scheduled within certain sub-periods within the time period. For instance, the effectivity score system 102 can determine a higher sparsity for a workday that has a certain number of scheduled events throughout a workday, spaced at various intervals-than for a workday that has the same number of scheduled events which are clustered together with fewer and/or shorter spaces between them. In some cases, a sparsity relates to a particular time period, such as a workday, a portion of a workday, or multiple workdays together.

As further illustrated in FIG. 4, the effectivity score system 102 utilizes a flow state effectivity model 406, such as a neural network, to generate a flow state effectivity score 408. More specifically, the flow state effectivity model 406 generates the flow state effectivity score 408 by processing the features from the digital calendar 402. In some embodiments, the flow state effectivity model 406 is trained to generate flow state effectivity scores based on sample calendar features and corresponding ground truth flow state effectivity scores. For instance, a sample sparsity is assigned a ground truth flow state effectivity score, and the effectivity score system 102 adjusts parameters of the flow state effectivity model 406 to improve its accuracy in predicting the ground truth score (and does so over multiple iterations for different ground truth scores and different sample features).

In some cases, the flow state effectivity model 406 generates or extracts a latent vector from the features of the digital calendar 402 in a latent embedding space. In these or other cases, the flow state effectivity model 406 generates or extracts a latent vector (or multiple latent vectors) to represent calendar events within a time period (e.g., a workday).

The flow state effectivity model 406 can further compare a latent meeting vector with other latent vectors extracted from features associated with other time periods (e.g., time periods with known flow state effectivity scores). The flow state effectivity model 406 can thus generate the flow state effectivity score 408 based on comparing time period vectors in the embedding space (e.g., to determine a distance, such as a cosine distance).

In some embodiments, the flow state effectivity model 406 generates a higher flow state effectivity score 408 for a time period that has a higher sparsity (or a lower density) of calendar events. In some cases, a higher sparsity is more than having fewer calendar events and further considers when the calendar events are scheduled within a given time period and/or how long they are. For instance, a time period with more scheduled events which are tightly packed and allow for long uninterrupted times can nevertheless have a higher flow state effectivity score 408 than a time period with fewer events that are spread out. In one or more embodiments, the flow state effectivity model 406 generates a lower flow state effectivity score 408 for a time period that is less sparse (or more dense).

As mentioned, in some cases, the flow state effectivity model 406 generates the flow state effectivity score 408 as a predicted score for an upcoming time period. For example, the flow state effectivity model 406 processes sparsity of events for an upcoming time period and generates the flow state effectivity score 408 to predict how effective the upcoming time period will be for the user account. In one or more embodiments, the flow state effectivity model 406 generates the flow state effectivity score 408 as an evaluation of a time period that has already occurred. For example, the flow state effectivity model 406 processes sparsity for a previous time period to indicate how effective the time period was for the user account. The flow state effectivity model 406 thus generates the flow state effectivity score 408 to indicate how effectively a user account (or will expend) time during a time period. In some cases, the flow state effectivity score 408 is on a normalized scale from 0 to 1, while in other cases the flow state effectivity score 408 is on a different scale (e.g., 0 to 10, 0 to 100, etc.).

As shown in FIG. 4, in certain cases, the effectivity score system 102 further generates a graphical visualization 412 of the flow state effectivity score 408. In particular, the effectivity score system 102 generates a graphical representation to visualize what the flow state effectivity score 408 represents for a user account. For instance, the effectivity score system 102 can generate the graphical visualization 412 in the form of a circle, a ring, or some other shape whose color represents the type of score (e.g., the flow state effectivity) and whose completeness corresponds to the value of the flow state effectivity score 408. In some cases, higher scores correspond to more complete rings while lower scores correspond to less complete rings (e.g., a score of 0 has no ring, while a score of 1 is a full ring). As shown, the graphical visualization 412 represents a flow state effectivity score 408 of 0.41, where the ring is less than half complete.

As illustrated in FIG. 4, the effectivity score system 102 can receive or determine an effectivity goal 410. For example, the effectivity score system 102 can receive an indication from a client device of the effectivity goal 410 set by a user account. In some cases, the effectivity score system 102 calibrates the graphical visualization 412 based on the effectivity goal 410 (e.g., by making the 360-degree scale of the ring span scores from a minimum score of 0 to a maximum score indicated by the effectivity goal 410). For instance, the effectivity score system 102 determines generates the graphical visualization 412 to indicate how close the flow state effectivity score 408 is to achieving the effectivity goal 410. In some cases, the effectivity score system 102 thus generates the graphical visualization 412 as a near complete ring because the flow state effectivity score 408 of 0.41 is close to the effectivity goal 410 of 0.5.

Figure 5:
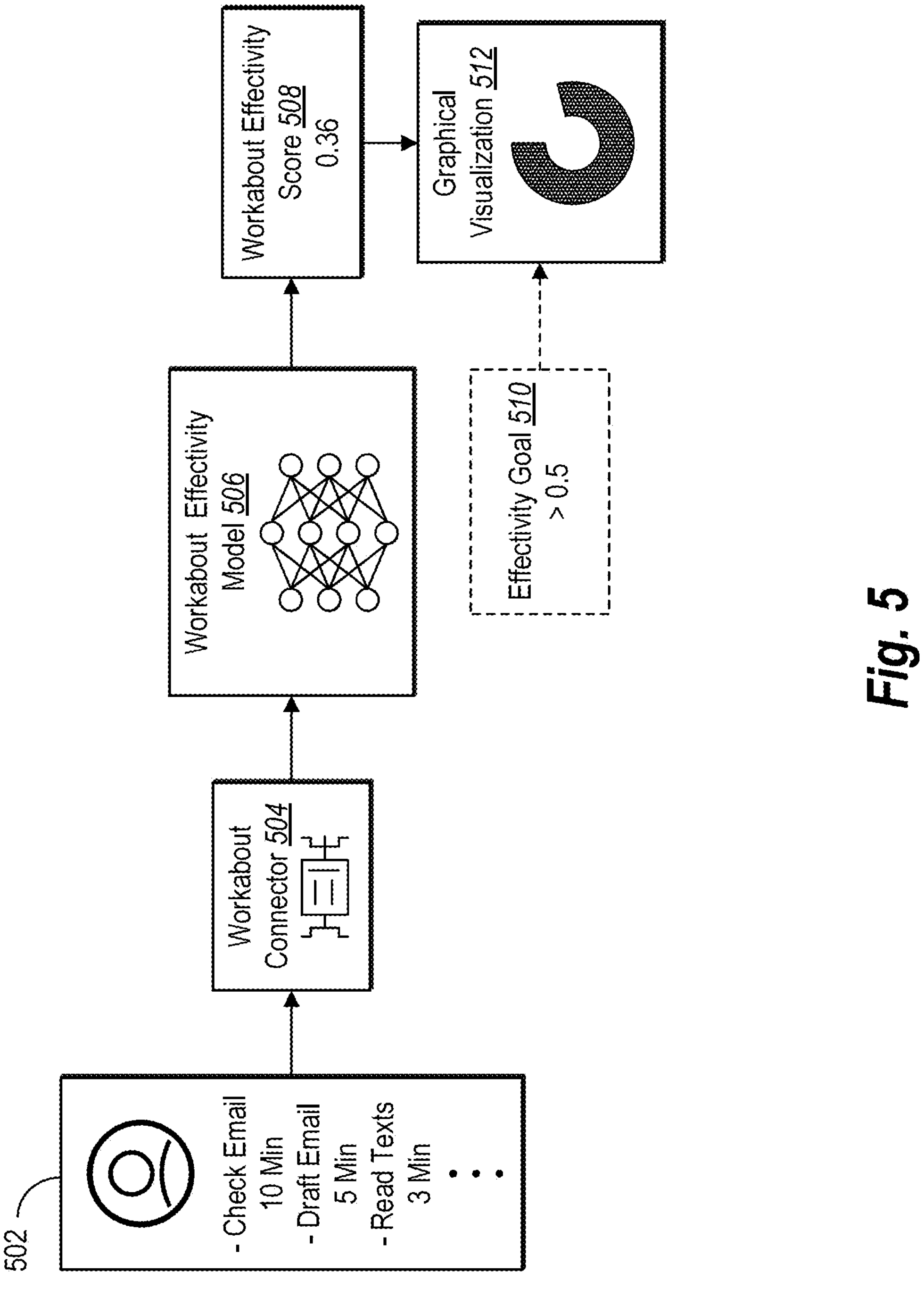
FIG. 5 illustrates an example diagram for generating work about work effectivity scores in accordance with one or more embodiments.

As indicated above, in certain described embodiments, the effectivity score system 102 generates a work about work effectivity score for a user account. In particular, the effectivity score system 102 utilizes a work about work effectivity model, such as a specifically trained machine learning model, to generate a work about work effectivity score from extracted meeting features. FIG. 5 illustrates an example diagram for generating a work about work effectivity score in accordance with one or more embodiments.

As illustrated in FIG. 5, the effectivity score system 102 utilizes a work about connector 504 to extract work about features from user account behavior 502 or activities associated with a user account. For example, the work about connector 504 extracts work about features from menial, administrative tasks (or other tasks that are not part of a job description associated with an assigned role of a user account) for a single time period (e.g., a workday or multiple appended workdays) or for multiple time periods. In some embodiments, the work about connector 504 extracts features by identifying previous and upcoming user account behavior for administrative tasks, such as checking email, drafting email, reading text messages, and submitting time sheets. For instance, the work about connector 504 extracts features that indicate durations of time spent performing individual work about actions. The effectivity score system 102 can further determine cumulative time spent on work about actions. In some cases, the effectivity score system 102 can weight different work about actions differently (e.g., where, for instance, checking emails is weighted less than filling out a form) and can determine a weighted time spent on work about tasks (e.g., as a weighted combination).

As further illustrated in FIG. 5, the effectivity score system 102 utilizes a work about work effectivity model 506, such as a neural network, to generate a work about work effectivity score 508. More specifically, the work about work effectivity model 506 generates the work about work effectivity score 508 by processing the features from the user account behavior 502. In some embodiments, the work about work effectivity model 506 is trained to generate work about work effectivity scores based on sample work about features and corresponding ground truth work about work effectivity scores. For instance, a sample (weighted) cumulative time is assigned a ground truth work about work effectivity score, and the effectivity score system 102 adjusts parameters of the work about work effectivity model 506 to improve its accuracy in predicting the ground truth score (and does so over multiple iterations for different ground truth scores and different sample features).

In some cases, the work about work effectivity model 506 generates or extracts a latent vector from the features of the user account behavior 502 in a latent embedding space. The work about work effectivity model 506 can further compare a latent behavior vector with other latent vectors extracted from features associated with other time periods (e.g., time periods with known work about work effectivity scores). The work about work effectivity model 506 can thus generate the work about work effectivity score 508 based on comparing time period vectors in the embedding space (e.g., to determine a distance, such as a cosine distance). In some embodiments, the work about work effectivity model 506 generates a higher work about work effectivity score 508 for a time period that has a lower (weighted) cumulative time on work about actions. In one or more embodiments, the work about work effectivity model 506 generates a lower work about work effectivity score 508 for a time period that has a higher (weighted) cumulative time spent on work about actions.

As mentioned, in some cases, the work about work effectivity model 506 generates the work about work effectivity score 508 as a predicted score for an upcoming time period. For example, the work about work effectivity model 506 processes predicted time for work about actions for an upcoming time period and generates the work about work effectivity score 508 to predict how effective the upcoming time period will be for the user account. In one or more embodiments, the work about work effectivity model 506 generates the work about work effectivity score 508 as an evaluation of a time period that has already occurred. For example, the work about work effectivity model 506 processes user account behavior for a previous time period to indicate how effective the time period was for the user account. The work about work effectivity model 506 thus generates the work about work effectivity score 508 to indicate how effectively a user account (or will expend) time during a time period. In some cases, the work about work effectivity score 508 is on a normalized scale from 0 to 1, while in other cases the work about work effectivity score 508 is on a different scale (e.g., 0 to 10, 0 to 100, etc.).

As shown in FIG. 5, in certain cases, the effectivity score system 102 further generates a graphical visualization 512 of the work about work effectivity score 508. In particular, the effectivity score system 102 generates a graphical representation to visualize what the work about work effectivity score 508 represents for a user account. For instance, the effectivity score system 102 can generate the graphical visualization 512 in the form of a circle, a ring, or some other shape whose color represents the type of score (e.g., the work about work effectivity) and whose completeness corresponds to the value of the work about work effectivity score 508. In some cases, higher scores correspond to more complete rings while lower scores correspond to less complete rings (e.g., a score of 0 has no ring, while a score of 1 is a full ring). As shown, the graphical visualization 512 represents a work about work effectivity score 508 of 0.76, where the ring is about three quarters complete.

As illustrated in FIG. 5, the effectivity score system 102 can receive or determine an effectivity goal 510. For example, the effectivity score system 102 can receive an indication from a client device of the effectivity goal 510 set by a user account. In some cases, the effectivity score system 102 calibrates the graphical visualization 512 based on the effectivity goal 510 (e.g., by making the 360-degree scale of the ring span scores from a minimum score of 0 to a maximum score indicated by the effectivity goal 510). For instance, the effectivity score system 102 determines generates the graphical visualization 512 to indicate how close the work about work effectivity score 508 is to achieving the effectivity goal 510. In some cases, the effectivity score system 102 thus generates the graphical visualization 512 as a complete ring because the work about work effectivity score 508 of 0.76 exceeds the effectivity goal 510 of 0.5.

Figure 6:
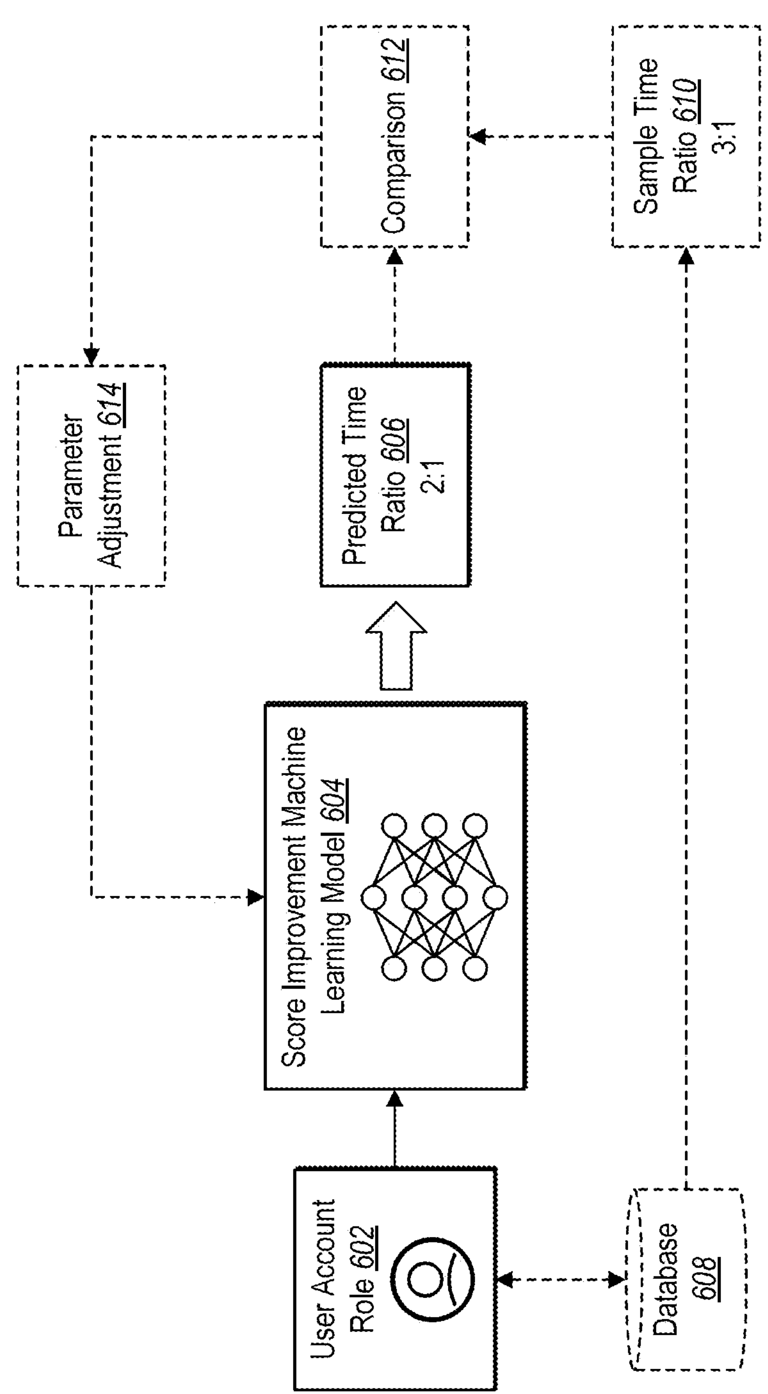
FIG. 6 illustrates an example diagram for training and utilizing a score improvement machine learning model in accordance with one or more embodiments.

As mentioned above, in certain described embodiments, the effectivity score system 102 generates recommendations for improving effectivity scores. To generate such recommendations, the effectivity score system 102 trains and utilizes a score improvement machine learning model to generate predicted time ratios for user accounts, where a time ratio indicates a ratio between work about time and flow state time (or vice-versa). FIG. 6 illustrates an example diagram of training and utilizing a score improvement machine learning model in accordance with one or more embodiments.

As illustrated in FIG. 6, the effectivity score system 102 identifies or determines a user account role 602. In particular, the effectivity score system 102 accesses a knowledge graph or an organizational ontology or structure that indicates a role of a user account within an organization. Such roles include administrator, developer, engineer, assistant, executive, technical support, student, teacher, or other positions within an organization.

As shown, the effectivity score system 102 utilizes the score improvement machine learning model 604 (e.g., a trained neural network) to generate a predicted time ratio 606 from the user account role 602. More particularly, the score improvement machine learning model 604 processes the user account role 602 to generate the predicted time ratio 606 that corresponds to the user account role 602. For instance, some roles may have different ranges of time ratios of work about work to flow state work (or vice-versa) that indicate healthy, good effectivity scores. In some cases, an engineer may have a ratio with more flow state time than work about time, while an assistant may have a ratio with more work about time than flow state time.

The score improvement machine learning model 604 thus generates the predicted time ratio 606 from the user account role 602. In some embodiments, the effectivity score system 102 further compares the predicted time ratio 606 with actual time expenditure associated with a user account. For instance, if the effectivity score system 102 generates a predicted time ratio of a 2:1 ratio of flow state work to work about work but determines that the actual time expenditure is 1:1 for the user account, then the effectivity score system 102 determines a low flow state effectivity score and/or a low work about work effectivity score. In some cases, the effectivity score system 102 further generates recommendations to improve one or more effectivity scores (and/or the time ratio) based on comparing predicted time ratios with actual detected time ratios. For example, the effectivity score system 102 can generate a recommendation to reduce work about work (e.g., by automatically replying to emails or by shifting work about work to another user account whose role is more fitted to the task). As another example, the effectivity score system 102 can generate a recommendation to rearrange calendar events. The effectivity score system 102 can generate recommendations based on determining that the predicted time ratio 606 differs by at least a threshold margin from an actual observed time ratio for a user account. Additional detail regarding various recommendations is provided below with reference to subsequent figures.

As further illustrated in FIG. 6, in some embodiments, the effectivity score system 102 trains the score improvement machine learning model 604 (as indicated by the dashed lines and boxes). To elaborate, the effectivity score system 102 trains the score improvement machine learning model 604 by generating the predicted time ratio 606 from the user account role 602 using the score improvement machine learning model 604. For instance, the effectivity score system 102 accesses the user account role 602 as a training sample from a database 608. In addition, the effectivity score system 102 accesses a sample time ratio 610 from the database 608 as well, where the sample time ratio 610 is a ground truth ratio corresponding to the user account role 602.

As shown, the effectivity score system 102 further performs a comparison 612 to compare the predicted time ratio 606 with the sample time ratio 610. For instance, the effectivity score system 102 utilizes a loss function, such as a cross entropy loss function or a mean squared error loss function, perform the comparison 612. Specifically, the effectivity score system 102 determines a difference or an error between the predicted time ratio 606 and the sample time ratio 610.

Based on the comparison 612, the effectivity score system 102 further performs a parameter adjustment 614. More particularly, the effectivity score system 102 adjusts parameters of the score improvement machine learning model 604 according to a measure of loss determined via the comparison 612. By performing the parameter adjustment 614, the effectivity score system 102 adjusts or modifies internal parameters, such as weights and biases, associated with the score improvement machine learning model 604 (e.g., for various layers and neurons of the neural network). Thus, the effectivity score system 102 modifies how the score improvement machine learning model 604 processes data to generate predicted time ratios. The effectivity score system 102 repeats this training process of generating predictions, comparing predicted time ratios with sample ratios, and reducing loss by adjusting parameters for multiple iterations (e.g., for a threshold number of iterations or until the loss of the comparison 612 satisfies a threshold measure of loss).

As mentioned above, in certain described embodiments, the effectivity score system 102 generates and provides graphical visualizations of effectivity scores for display. In particular, the effectivity score system 102 generates a graphical visualization that simultaneously portrays a meeting effectivity score, a flow state effectivity score, and a work about work effectivity score in a single user interface. The effectivity score system 102 can also update a graphical visualization over time as effectivity scores changed based on time expenditure associated with a user account.

Figure 7:
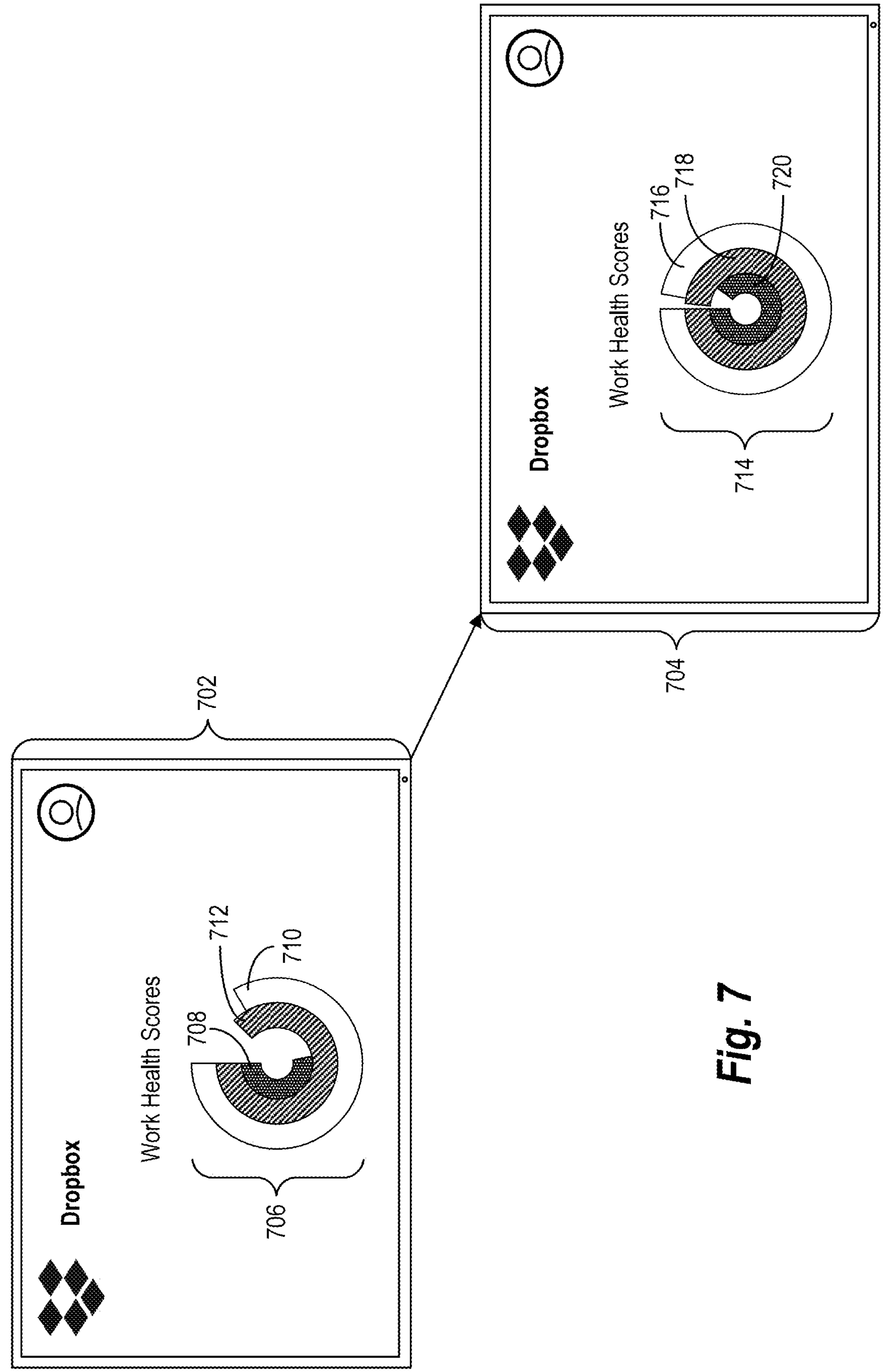
FIG. 7 illustrates example effectivity interfaces for visualizing effectivity scores in accordance with one or more embodiments.

FIG. 7 illustrates an example diagram for providing and modifying a graphical visualization of effectivity scores in accordance with one or more embodiments.

As illustrated in FIG. 7, the effectivity score system 102 provides an effectivity interface 702 for display on a client device. To elaborate, the effectivity score system 102 generates the effectivity interface 702 to include a graphical visualization 706. As shown, the graphical visualization 706 includes multiple constituent rings nested within one another. The ring 708 represents one effectivity score (e.g., a work about work effectivity score), while the ring 710 represents another effectivity score (e.g., a meeting effectivity score), and the ring 712 represents yet another effectivity score (e.g., a flow state effectivity score). In some embodiments, the graphical visualization 706 can have another shape or form factor, such as concentric circles, rectangles, or triangles. In these or other embodiments, the rings of the graphical visualization 706 can be in another order, representing different effectivity scores in different positions.

As further illustrated in FIG. 7, the effectivity score system 102 detects a change in effectivity scores and generates the graphical visualization 714 to reflect the change. To elaborate, the effectivity score system 102 detects changes in a digital calendar, in features corresponding to scheduled meetings, and/or in user account behavior regarding work about actions which impact one or more effectivity scores. The effectivity score system 102 thus generates new effectivity scores and further generates the effectivity interface 704 to include the graphical visualization 714.

As shown, the graphical visualization 714 includes a ring 716, a ring 718, and a ring 720. Each of the rings represent respective effectivity scores. For example, the ring 716 represents a meeting effectivity score which has increased compared to the effectivity score of the ring 710 (as indicated by comparing the completeness of the rings). In addition, the ring 716 represents a flow state effectivity score which has also increased compared to the ring 712. Further, the ring 720 represents a work about work effectivity score which has increased compared to the ring 708.

Figure 8:
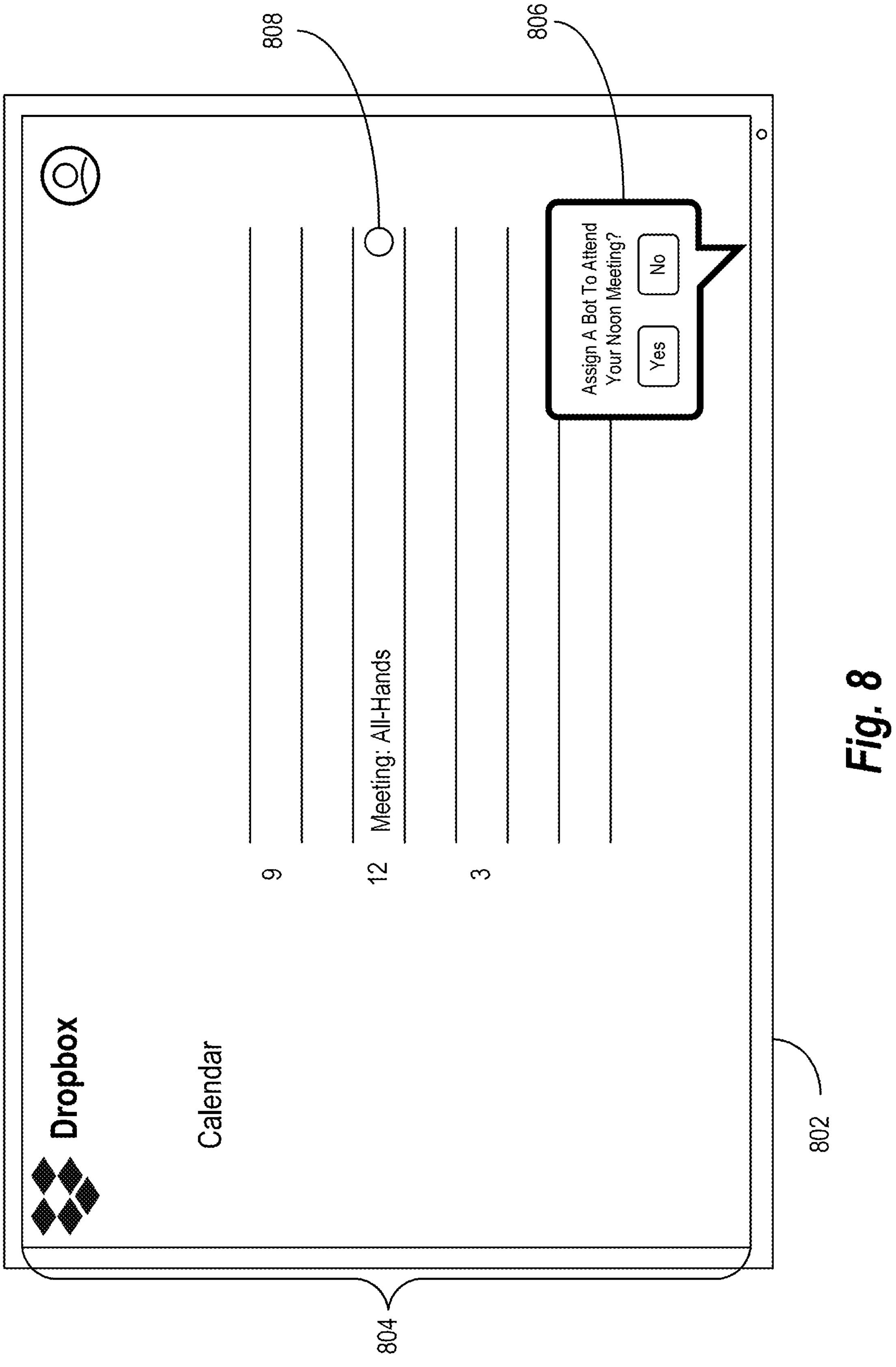
FIG. 8 illustrates an example user interface for providing a recommendation to improve a meeting effectivity score in accordance with one or more embodiments.

As mentioned above, in certain embodiments, the effectivity score system 102 generates and provides recommendations for improving effectivity scores. For example, the effectivity score system 102 generates and provides a recommendation to improve a meeting effectivity score (and/or a flow state effectivity score) by assigning a bot to attend a meeting in place of a user account. FIG. 8 illustrates an example user interface for providing recommendations to improve effectivity scores in accordance with one or more embodiments.

As illustrated in FIG. 8, the effectivity score system 102 generates and provides the user interface 804 for display on a client device 802. In particular, the effectivity score system 102 generates a recommendation 806 for display within the user interface 804. For example, upon detecting that the client device 802 is displaying a digital calendar that includes a scheduled meeting ("Meeting: All-Hands"), and upon determining that the meeting effectivity score for the upcoming meeting is below a threshold, the effectivity score system 102 generates and provides the recommendation 806. Specifically, the effectivity score system 102 generates the recommendation 806 that is selectable to (generate and) assign a bot to attend the meeting in place of the user account. Indeed, upon selection of the "yes" option, the effectivity score system 102 generates a virtual representative to attend the meeting in place of the user account and to record meeting highlights (e.g., a summary) to provide to the user account. For instance, the effectivity score system 102 generates a virtual profile for the user account to attend a video call for the meeting. The effectivity score system 102 thus helps the user account improve an effectivity score by freeing up time that would otherwise be spent on an unproductive meeting.

As further illustrated in FIG. 8, the effectivity score system 102 generates and provides a graphical visualization 808 for the scheduled meeting. For example, the effectivity score system 102 generates the graphical visualization 808 as a colored (or patterned) circle or dot that indicates a meeting effectivity score associated with the meeting. As shown, the effectivity score system 102 generates a low effectivity score for the meeting (e.g., below a threshold), and the effectivity score system 102 thus generates the graphical visualization 808 in a corresponding color/pattern, along with the recommendation 806 to improve the meeting effectivity score.

Figure 9:
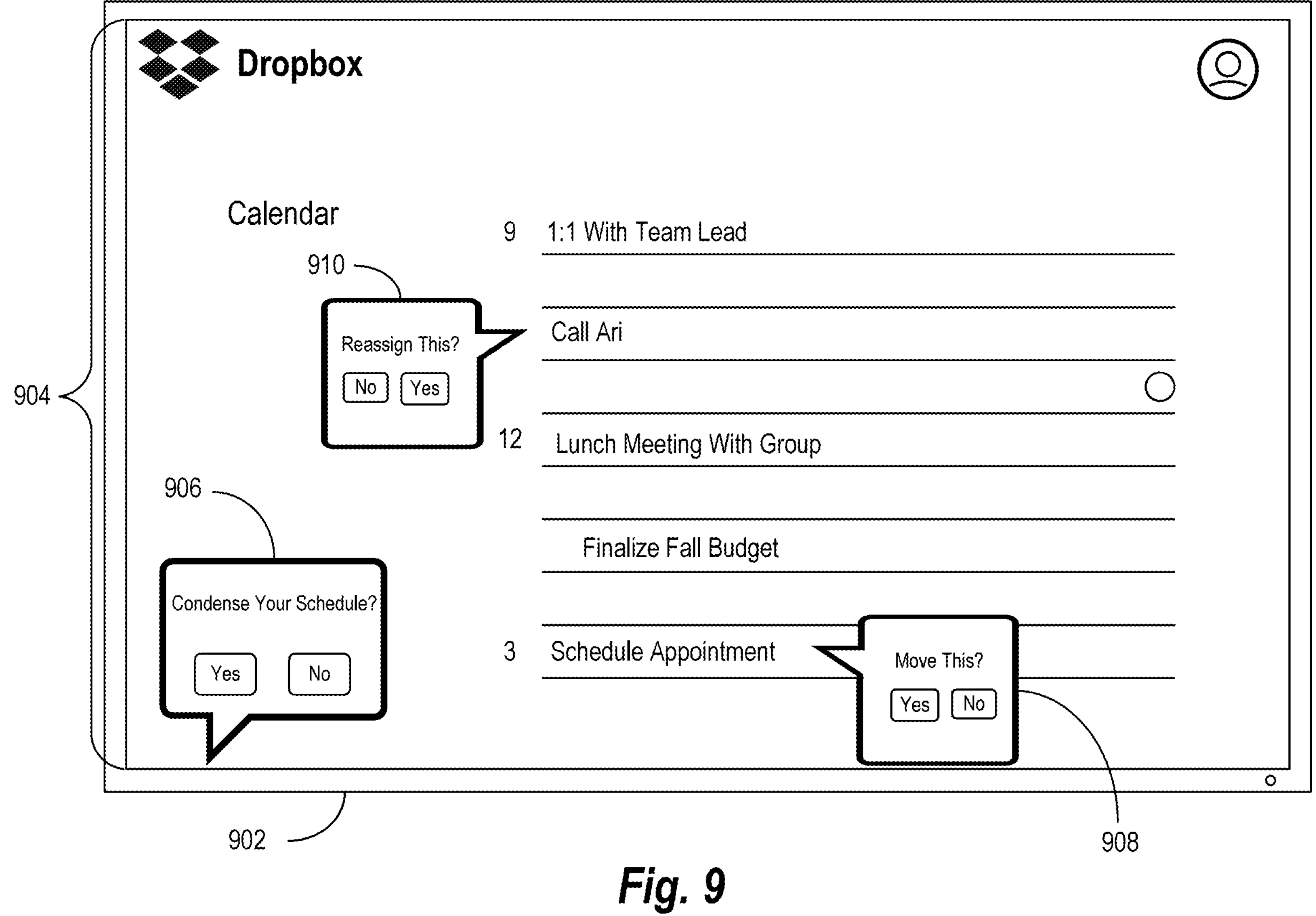
FIG. 9 illustrates an example user interface for providing recommendations to improve effectivity scores in accordance with one or more embodiments.

As mentioned, in certain embodiments, the effectivity score system 102 generates and provides recommendations for improving effectivity scores in other ways as well. For example, the effectivity score system 102 generates a recommendation to condense a schedule, to move a particular calendar event, and/or to reassign certain tasks or processes. FIG. 9 illustrates an example user interface including recommendations for improving effectivity scores in accordance with one or more embodiments.

As illustrated in FIG. 9, the effectivity score system 102 generates and provides a user interface 904 for display on a client device 902. Within the user interface 904, the effectivity score system 102 provides a recommendation 906. The effectivity score system 102 can generate the recommendation based on determining that one or more effectivity scores do not satisfy a threshold and/or determining that a time ratio of the user account role differs from a predicted time ratio by at least a threshold amount. To elaborate, the effectivity score system 102 generates the recommendation 906 that includes a selectable option to condense a digital calendar for a user account. In response to a single interaction with the client device 902, the effectivity score system 102 can rearrange multiple calendar events scheduled for the user account. For instance, the effectivity score system 102 can rearrange calendar events to achieve at least a threshold flow state effectivity score (e.g., by reducing sparsity) and/or to improve the flow state effectivity score by at least a threshold amount. Indeed, the effectivity score system 102 can condense calendar events to reschedule them closer together within a time period (e.g., a workday) to free up longer uninterrupted stretches for flow state production.

In some embodiments, rearranging calendar events is different for different user accounts. For example, a user account whose role is higher in an organization can more likely reschedule calendar events unilaterally. Indeed, upon selection of the option to condense a calendar, the effectivity score system 102 can determine the user account's role and/or permissions for rescheduling each identified calendar event. For calendar events that are reschedule-able by the user account, the effectivity score system 102 determines new times within the same time period and/or a different time period. In some cases, the effectivity score system 102 rearranges and orders calendar events to maximize one or more effectivity scores or to achieve at least a threshold effectivity score (e.g., a threshold flow state effectivity score and/or a threshold work about work effectivity score). In certain embodiments, different user accounts (or user account roles) have different effectivity score thresholds, as set by user-defined effectivity goals and/or defaulted for roles.

For a user account whose role is lower in an organization (and/or for calendar events not reschedule-able by a user account), condensing calendar events involves additional or alternative processes. For instance, upon selection of the option to condense a calendar, the effectivity score system 102 identifies calendar events that are arranged by other user accounts and/or determines user accounts with permissions to change scheduled times for the calendar events. In some cases, the effectivity score system 102 automatically (e.g., without additional input beyond the single selection of the rearrange option in the recommendation 906) sends rescheduling requests to user accounts with rescheduling permissions for each respective calendar event to be rescheduled (for which the user account does not have rescheduling permissions). In certain embodiments, the effectivity score system 102 sends rescheduling requests for a subset of calendar events, such as those with fewer than a threshold number of invitees and/or with certain titles or topics (e.g., not for all-hands meetings involving large numbers of user accounts).

As further illustrated in FIG. 9, the effectivity score system 102 generates and provides a recommendation 908. In particular, the effectivity score system 102 can generate the recommendation 908 to move an individual calendar event ("Schedule Appointment"). In some cases, the effectivity score system 102 generates the recommendation 908 based on determining that moving the calendar event would improve one or more effectivity scores (and/or time ratios), such as a flow state effectivity score and/or a work about work effectivity score. For example, the effectivity score system 102 can determine that the event is a work about action and that moving the event to a new time period would improve a work about work effectivity score and/or that moving the event to a new time within the same time period would improve a flow state effectivity score. Thus, in response to a selection of the option within the recommendation 908 to move the calendar event, the effectivity score system 102 can determine a new time (within the same time period or a different time period) to move the event.

In some embodiments, rescheduling calendar events involves load balancing across multiple time periods. To elaborate, in response to the selection of the recommendation 908 (or the recommendation 906), the effectivity score system 102 can determine predicted effectivity scores for multiple time periods (e.g., workdays) and can select a time period to relocate one or more events. Specifically, the effectivity score system 102 can balance meeting effectivity scores, flow state effectivity scores, and/or work about work effectivity scores across multiple time periods by rescheduling events. For instance, if one time period has a high sparsity of events and another time period has enough flow state time to retain at least a threshold flow state effectivity score after rescheduling, then the effectivity score system 102 can reschedule the event for both time periods to meet the threshold score (e.g., as set by an effectivity goal and/or a time ratio).

As further illustrated in FIG. 9, the effectivity score system 102 generates and provides a recommendation 910. In particular, the effectivity score system 102 generates the recommendation 910 based on determining that one or more effectivity scores fail to satisfy a threshold and/or that reassigning a calendar event to another user account would improve the effectivity score(s). For example, the effectivity score system 102 determines that the calendar event ("Call Ari") is a work about action and that the work about work effectivity score for the time period fails to satisfy a threshold. In addition, the effectivity score system 102 determines, from a knowledge graph, one or more other user accounts whose roles (and/or relationships with the user account and/or the Ari user account) are suitable for reassigning the event. The effectivity score system 102 thus generates the recommendation 910 that includes a selectable option to reassign the event to an alternative user account. In response to a selection of the option to reassign, the effectivity score system 102 removes the calendar event and adds it to a calendar of another user account to improve a work about work effectivity score and/or a flow state effectivity score (while balancing effectivity scores for the other user account as well to prevent them from dropping below a threshold).

FIGS. 1-9, the corresponding text, and the examples provide a number of different systems and methods for generating and visualizing effectivity scores for user accounts. In addition to the foregoing, implementations can also be described in terms of flowcharts comprising acts steps in a method for accomplishing a particular result. For example, FIG. 10 illustrates an example series of acts for generating, visualizing, and improving effectivity in accordance with one or more embodiments.

Figure 10:
FIG. 10 illustrates an example flowchart of a series of acts for generating, visualizing, and improving effectivity scores in accordance with one or more embodiments.
Figure 10:
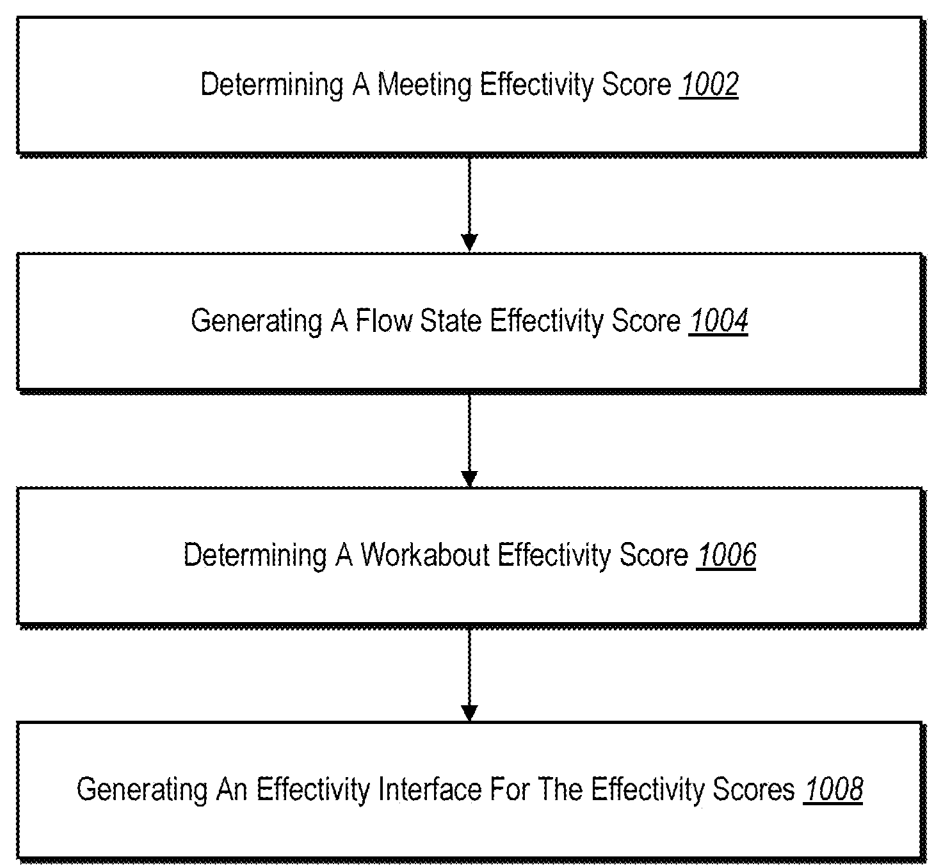

While FIG. 10 illustrates acts according to certain implementations, alternative implementations may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further implementations, a system can perform the acts of FIG. 10.

As illustrated in FIG. 10, the series of acts 1000 may include an act 1002 of determining a meeting effectivity score. In particular, the act 1002 involves determining, for a user account of a content management system, a meeting effectivity score based on one or more meeting features extracted from meeting data stored for the user account within the content management system. The series of acts 1000 can also include an act 1004 of generating a flow state effectivity score. In particular, the act 1004 can involve generating, for the user account, a flow state effectivity score based at least in part on sparsity of calendar events within a digital calendar of the user account. In addition, the series of acts 1000 can include an act 1006 of determining a work about work effectivity score. In particular, the act 1006 can involve determining a work about work effectivity score for the user account by detecting user account behavior in relation to processes classified as work about actions. Further, the series of acts 1000 can include an act 1008 of generating an effectivity interface for the effectivity scores. In particular, the act 1008 can involve generating, for display on a client device associated with the user account, an effectivity interface comprising a graphical visualization of the meeting effectivity score, the flow state effectivity score, and the work about work effectivity score.

In some embodiments, the series of acts 1000 includes an act of generating the effectivity interface by generating the graphical visualization as a set of colored concentric rings including: a first ring in a first color representing the meeting effectivity score, a second ring in a second color representing the flow state effectivity score, and a third ring in a third color representing the work about work effectivity score. The series of acts 1000 can also include an act of determining the meeting effectivity score by: extracting, utilizing a meeting connector that monitors data for a meeting of the user account, the one or more meeting features comprising one or more of a binary indication of whether the meeting is recurring, a binary indication of whether the meeting has an agenda, or a binary indication of whether the meeting is a follow-up to a previous meeting, (an indication of user accounts attending the virtual meeting, an indication of user accounts invited to the virtual meeting, and indication of a number of invitees for the virtual meeting, or an indication of a meeting type for the virtual meeting) and generating, before the meeting, the meeting effectivity score from the one or more meeting features utilizing a meeting effectivity machine learning model, wherein the meeting effectivity score indicates a prediction of how productive the meeting will be for the user account.

In some embodiments, the series of acts 1000 includes an act of generating the flow state effectivity score by extracting, utilizing a flow state connector that monitors calendar data for the user account for a workday, flow state features comprising sparsity of calendar events, regularity of calendar events, duration of calendar events, and type of calendar events, and generating the flow state effectivity score from the flow state features using a flow state effectivity machine learning model, wherein the flow state effectivity score indicates a prediction of how productive the workday will be for the user account. In the same or other embodiments, the series of acts 1000 includes an act of determining the work about work effectivity score by determining, using a work about connector to monitor user account behavior, a duration of time spent by the user account performing a work about action, wherein the work about action comprises a user account activity that is not part of a job description for a role assigned to the user account within the content management system, and generating, using a work about work effectivity machine learning model, the work about work effectivity score from the duration of time spent performing the work about action.

In one or more embodiments, the series of acts 1000 includes an act of receiving, from the client device of the user account, an indication of an effectivity goal designating a target duration of uninterrupted flow state time for the user account. The series of acts 1000 can also include an act of generating the flow state effectivity score to indicate a probability of accomplishing the effectivity goal based on calendar data associated with the user account.

Additionally, the series of acts 1000 can include an act of modifying one or more of the meeting effectivity score, the flow state effectivity score, or the work about work effectivity score based on detecting changes to user account data within the content management system. The series of acts 1000 can also include an act of modifying the graphical visualization within the effectivity interface to visually portray changes in scores based on modifying the one or more of the meeting effectivity score, the flow state effectivity score, or the work about work effectivity score.

In some embodiments, the series of acts 1000 includes an act of categorizing, based on the meeting effectivity score, a virtual meeting for the user account into a meeting category comprising one of a brainstorming meeting category or an informational meeting category. The series of acts 1000 can also include an act of generating a recommendation to move a calendar event within a digital calendar of the user account based on the flow state effectivity score. The series of acts 1000 can further include an act of providing the recommendation for display on the client device.

In certain embodiments, the series of acts 1000 includes an act of generating the meeting effectivity score, the flow state effectivity score, and the work about work effectivity score for a group of user accounts that includes the user account. Additionally, the series of acts 1000 can include an act of generating the graphical visualization to visually portray the meeting effectivity score, the flow state effectivity score, and the work about work effectivity score for display on client devices associated with the group of user accounts.

In one or more implementation, the series of acts 1000 includes an act of generating a load balance recommendation comprising a selectable option to move a set of calendar events from a first time period to a second time period to improve the flow state effectivity score of the first time period. Further, the series of acts 1000 can include an act of providing the load balance recommendation for display on the client device. In addition, the series of acts 1000 can include generating the graphical visualization of the meeting effectivity score by: generating a predicted amount of preparation time for a virtual meeting based on the meeting effectivity score, and generating the graphical visualization as a colored indicator in a color corresponding to the predicted amount of preparation time.

In some embodiments, the series of acts 1000 includes an act of generating the effectivity interface to include, for display together with the first graphical visualization, the second graphical visualization, and the third graphical visualization, a visual recommendation for improving one or more of the meeting effectivity score, the flow state effectivity score, or the work about work effectivity score. The series of acts 1000 can include an act of determining a role assigned to the user account within an organization. The series of acts 1000 can also include an act of generating, from the role assigned to the user account, a recommendation for improving the flow state effectivity score by utilizing a score improvement machine learning model trained on sample time ratios corresponding to sample organizational roles. The series of acts 1000 can further include an act of providing the recommendation for display on the client device.

Additionally, the series of acts 1000 can include generating a recommendation to assign a bot to attend a virtual meeting based on the meeting effectivity score for a virtual meeting scheduled for the user account. The series of acts 1000 can further include providing the recommendation for display on the client device. In addition, the series of acts 1000 can include an act of generating a predicted duration for a calendar event scheduled for the user account and an act of determining a suggested scheduling time for the calendar event for increasing the flow state effectivity score based on the predicted duration. In some cases, the series of acts 1000 includes an act of generating the effectivity interface by generating a set of colored concentric shapes including: a first shape in a first color representing the meeting effectivity score, a second shape in a second color representing the flow state effectivity score, and a third shape in a third color representing the work about work effectivity score.

The components of the effectivity score system 102 can include software, hardware, or both. For example, the components of the effectivity score system 102 can include one or more instructions stored on a computer-readable storage medium and executable by processors of one or more computing devices. When executed by one or more processors, the computer-executable instructions of the effectivity score system 102 can cause a computing device to perform the methods described herein. Alternatively, the components of the effectivity score system 102 can comprise hardware, such as a special purpose processing device to perform a certain function or group of functions. Additionally or alternatively, the components of the effectivity score system 102 can include a combination of computer-executable instructions and hardware.

Furthermore, the components of the effectivity score system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the effectivity score system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
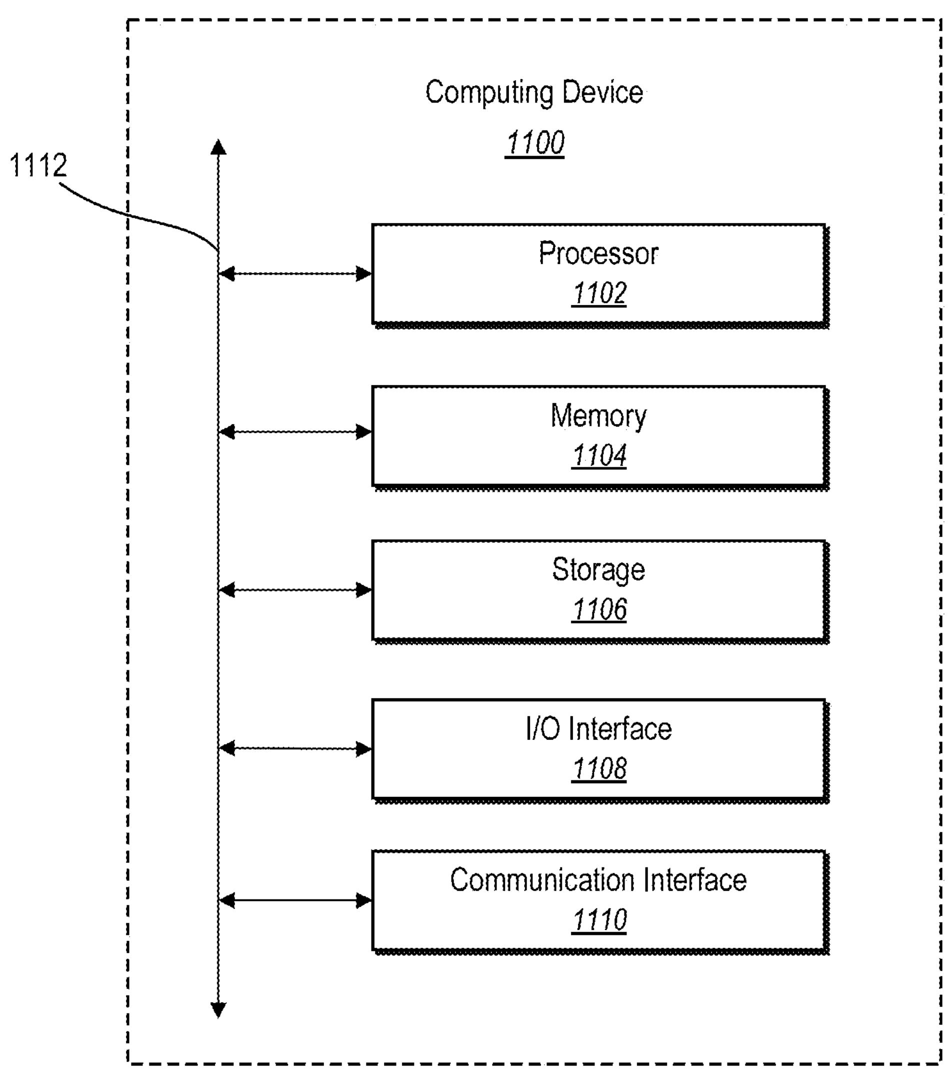
FIG. 11 illustrates a block diagram of an exemplary computing device in accordance with one or more embodiments.

FIG. 11 illustrates a block diagram of exemplary computing device 1100 (e.g., the server(s) 104 and/or the client device 108) that may be configured to perform one or more of the processes described above. One will appreciate that server(s) 104 and/or the client device 108 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
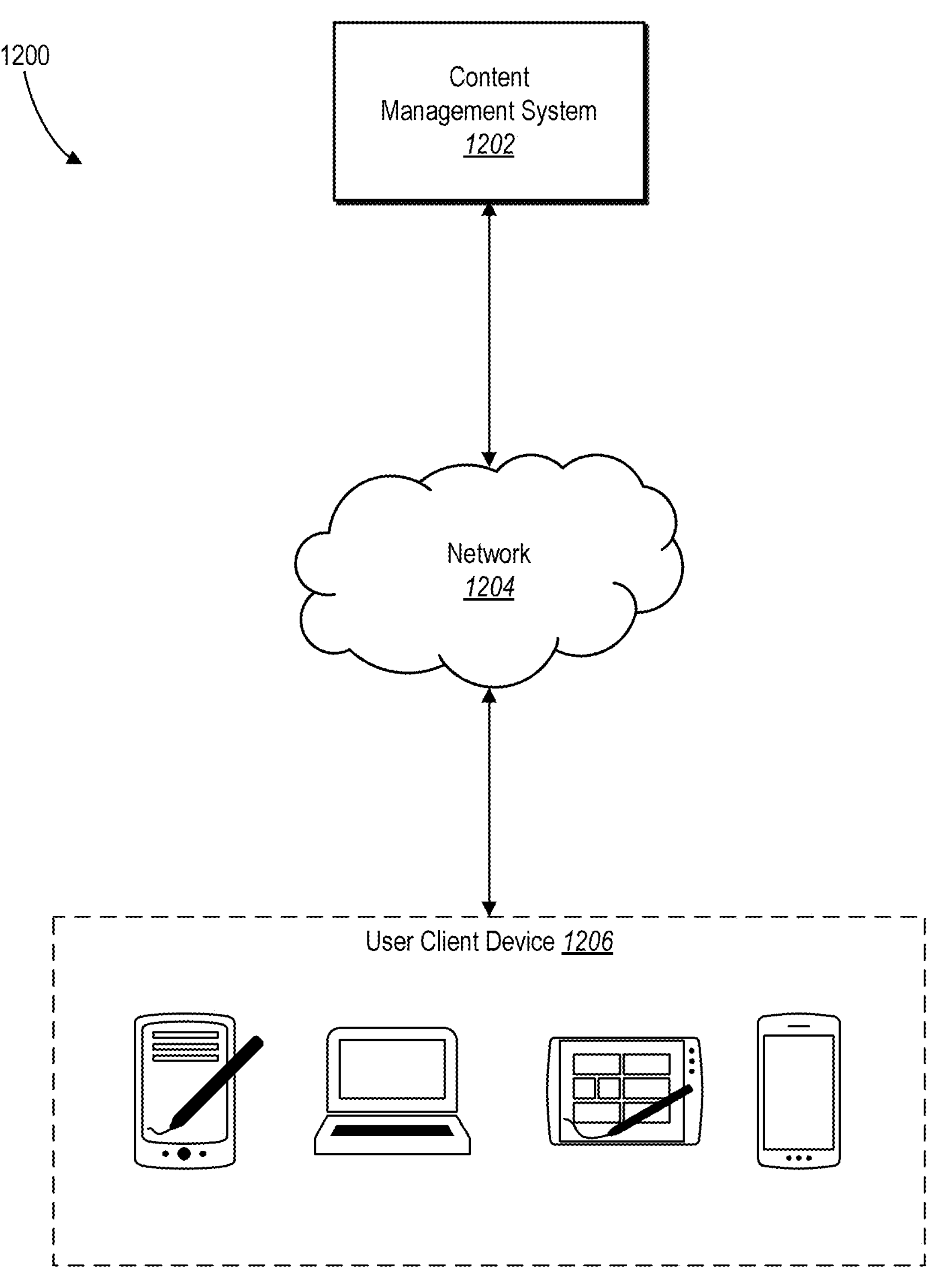
FIG. 12 illustrates an example environment of a networking system having the effectivity score system in accordance with one or more embodiments.

FIG. 12 is a schematic diagram illustrating environment 1200 within which one or more implementations of the effectivity score system 102 can be implemented. For example, the effectivity score system 102 may be part of a content management system 1202 (e.g., the content management system 106). Content management system 1202 may generate, store, manage, receive, and send digital content (such as digital content items). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full-or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in-or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:

determining, for a user account of a content management system, a meeting effectivity score based on one or more meeting features extracted from meeting data stored for the user account within the content management system;

generating, for the user account, a flow state effectivity score based at least in part on sparsity of calendar events within a digital calendar associated with the user account;

determining a work about work effectivity score for the user account by detecting user account behavior in relation to processes classified as work about actions;

generating, for display on a client device associated with the user account, an effectivity interface comprising a graphical visualization of the meeting effectivity score, the flow state effectivity score, and the work about work effectivity score;

providing, for display in the effectivity interface, a calendar condensing option selectable to automatically condense the digital calendar associated with the user account;

receiving, from the client device, a single-input interaction with the calendar condensing option; and in response to the single-input interaction with the calendar condensing option, condensing the digital calendar according to one or more of the meeting effectivity score, the flow state effectivity score, or the work about work effectivity score, wherein condensing the digital calendar comprises automatically rearranging one or more calendar events scheduled for the user account in the digital calendar.

2. The method of claim 1, wherein automatically rearranging the one or more calendar events in response to the single-input interaction with the calendar condensing option comprises automatically executing one or more of the following:

determining one or more new times for rescheduling the one or more calendar events;

distributing digital communications to one or more attendees of the one or more calendar events; or generating one or more rescheduled calendar events for the digital calendar condensing the digital.

3. The method of claim 1, wherein determining the meeting effectivity score comprises:

extracting, utilizing a meeting connector that monitors data for a meeting of the user account, the one or more meeting features comprising one or more of a binary indication of whether the meeting is recurring, a binary indication of whether the meeting has an agenda, or a binary indication of whether the meeting is a follow-up to a previous meeting; and generating, before the meeting, the meeting effectivity score from the one or more meeting features utilizing a meeting effectivity machine learning model, wherein the meeting effectivity score indicates a prediction of how productive the meeting will be for the user account.

4. The method of claim 1, wherein generating the flow state effectivity score comprises:

extracting, utilizing a flow state connector that monitors calendar data for the user account for a workday, flow state features comprising sparsity of calendar events, regularity of calendar events, duration of calendar events, and type of calendar events; and generating the flow state effectivity score from the flow state features using a flow state effectivity machine learning model, wherein the flow state effectivity score indicates a prediction of how productive the workday will be for the user account.

5. The method of claim 1, wherein determining the work about work effectivity score comprises:

determining, using a work about connector to monitor user account behavior, a duration of time spent by the user account performing a work about action, wherein the work about action comprises a user account activity that is not part of a job description for a role assigned to the user account within the content management system; and generating, using a work about work effectivity machine learning model, the work about work effectivity score from the duration of time spent performing the work about action.

6. The method of claim 1, further comprising:

providing the calendar condensing option in response to determining that the meeting effectivity score, the flow state effectivity score, or the work about work effectivity score fail to satisfy a threshold; and in response to condensing the digital calendar, generating a modified meeting effectivity score, a modified flow state effectivity score, or a modified work about work effectivity score that satisfies the threshold.

7. The method of claim 1, further comprising:

modifying one or more of the meeting effectivity score, the flow state effectivity score, or the work about work effectivity score based on detecting changes to user account data within the content management system; and modifying the graphical visualization within the effectivity interface to visually portray changes in scores based on modifying the one or more of the meeting effectivity score, the flow state effectivity score, or the work about work effectivity score.

8. A system comprising:

at least one processor; and a non-transitory computer readable medium comprising instructions that, when executed by the at least one processor, cause the system to:

determine, for a user account of a content management system, a meeting effectivity score by using a meeting effectivity model to process one or more meeting features extracted from meeting data stored for the user account within the content management system;

generate, for the user account, a flow state effectivity score by using a flow state effectivity model to process calendar data reflecting a sparsity of calendar events within a digital calendar associated with the user account;

determine a work about work effectivity score for the user account by using a work about work effectivity model to process user account behavior in relation to processes classified as work about actions;

generate, for display on a client device associated with the user account, an effectivity interface comprising a graphical visualization of the meeting effectivity score, the flow state effectivity score, and the work about work effectivity score;

provide, for display in the effectivity interface, a calendar condensing option selectable to automatically condense the digital calendar associated with the user account;

receive, from the client device, a single-input interaction with the calendar condensing option; and in response to the single-input interaction with the calendar condensing option, condense the digital calendar according to one or more of the meeting effectivity score, the flow state effectivity score, or the work about work effectivity score, wherein condensing the digital calendar comprises automatically rearranging one or more calendar events scheduled for the user account in the digital calendar.

9. The system of claim 8, further comprising instructions that, when executed by the at least one processor, cause the system to:

extract, utilizing a meeting connector that monitors data for a virtual meeting of the user account, the one or more meeting features comprising one or more of a binary indication of whether the virtual meeting is recurring, a binary indication of whether the virtual meeting has an agenda, a binary indication of whether the virtual meeting is a follow-up to a previous virtual meeting, an indication of user accounts attending the virtual meeting, an indication of user accounts invited to the virtual meeting, and indication of a number of invitees for the virtual meeting, or an indication of a meeting type for the virtual meeting; and generate the meeting effectivity score by utilizing the meeting effectivity model to determine, from the one or more meeting features, an indication of how productive the virtual meeting is for the user account.

10. The system of claim 8, further comprising instructions that, when executed by the at least one processor, cause the system to provide the calendar condensing option by providing, for display in the effectivity interface and utilizing a score improvement machine learning model, a digital recommendation for improving one or more of the meeting effectivity score, the flow state effectivity score, or the work about work effectivity score, wherein the digital recommendation comprises the calendar condensing option.

11. The system of claim 8, further comprising instructions that, when executed by the at least one processor, cause the system to:

generate a recommendation to move a calendar event within a digital calendar of the user account based on the flow state effectivity score; and provide the recommendation for display on the client device.

12. The system of claim 8, further comprising instructions that, when executed by the at least one processor, cause the system to:

generate the meeting effectivity score, the flow state effectivity score, and the work about work effectivity score for a group of user accounts that includes the user account; and generate the graphical visualization to visually portray the meeting effectivity score, the flow state effectivity score, and the work about work effectivity score for display on client devices associated with the group of user accounts.

13. The system of claim 8, further comprising instructions that, when executed by the at least one processor, cause the system to:

generate a load balance recommendation comprising the calendar condensing option to move a set of calendar events from a first time period to a second time period to improve the flow state effectivity score of the first time period; and provide the load balance recommendation for display on the client device.

14. The system of claim 8, further comprising instructions that, when executed by the at least one processor, cause the system to generate the graphical visualization of the meeting effectivity score by:

generating a predicted amount of preparation time for a virtual meeting based on the meeting effectivity score; and generating the graphical visualization as a colored indicator in a color corresponding to the predicted amount of preparation time.

15. A non-transitory computer readable medium comprising instructions that, when executed by at least one processor, cause the at least one processor to:

determine, for a user account of a content management system, a meeting effectivity score based on one or more meeting features extracted from meeting data stored for the user account within the content management system;

generate, for the user account, a flow state effectivity score based at least in part on sparsity of calendar events within a digital calendar associated with the user account;

determine a work about work effectivity score for the user account by detecting user account behavior in relation to processes classified as work about actions;

generate, for display on a client device associated with the user account, an effectivity interface comprising a first graphical visualization depicting the meeting effectivity score, a second graphical visualization depicting the flow state effectivity score, and a third graphical visualization depicting the work about work effectivity score;

provide, for display in the effectivity interface, a calendar condensing option selectable to automatically condense the digital calendar associated with the user account;

receive, from the client device, a single-input interaction with the calendar condensing option; and in response to the single-input interaction with the calendar condensing option, condense the digital calendar according to one or more of the meeting effectivity score, the flow state effectivity score, or the work about work effectivity score, wherein condensing the digital calendar comprises automatically rearranging one or more calendar events scheduled for the user account in the digital calendar.

16. The non-transitory computer readable medium of claim 15, further comprising instructions that, when executed by the at least one processor, cause the at least one processor to generate the effectivity interface to include, for display together with the first graphical visualization, the second graphical visualization, and the third graphical visualization, a visual recommendation for improving one or more of the meeting effectivity score, the flow state effectivity score, or the work about work effectivity score.

17. The non-transitory computer readable medium of claim 15, further comprising instructions that, when executed by the at least one processor, cause the at least one processor to:

determine a role assigned to the user account within an organization;

generate, from the role assigned to the user account, a recommendation for improving the flow state effectivity score by utilizing a score improvement machine learning model trained on sample time ratios corresponding to sample organizational roles; and provide the recommendation for display on the client device.

18. The non-transitory computer readable medium of claim 15, further comprising instructions that, when executed by the at least one processor, cause the at least one processor to:

generate a recommendation to assign a bot to attend a virtual meeting based on the meeting effectivity score for a virtual meeting scheduled for the user account; and provide the recommendation for display on the client device.

19. The non-transitory computer readable medium of claim 15, further comprising instructions that, when executed by the at least one processor, cause the at least one processor to:

generate a predicted duration for a calendar event scheduled for the user account; and determine a suggested scheduling time for the calendar event for increasing the flow state effectivity score based on the predicted duration.

20. The non-transitory computer readable medium of claim 15, further comprising instructions that, when executed by the at least one processor, cause the at least one processor to generate the effectivity interface by generating a set of colored concentric shapes comprising:

a first shape in a first color representing the meeting effectivity score;

a second shape in a second color representing the flow state effectivity score; and a third shape in a third color representing the work about work effectivity score.

* * * * *